(12) United States Patent
Dhanuka et al.

(10) Patent No.: US 11,335,050 B2
(45) Date of Patent: May 17, 2022

(54) GENERATING DIGITAL IMAGE EDITING GUIDES BY DETERMINING AND FILTERING RASTER IMAGE CONTENT BOUNDARIES

(71) Applicant: Adobe Inc., San Jose, CA (US)

(72) Inventors: Praveen Kumar Dhanuka, Howrah (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/064,135

(22) Filed: Oct. 6, 2020

(65) Prior Publication Data
US 2022/0108505 A1 Apr. 7, 2022

(51) Int. Cl.
*G06T 11/60* (2006.01)
*G06T 5/00* (2006.01)

(52) U.S. Cl.
CPC .............. *G06T 11/60* (2013.01); *G06T 5/002* (2013.01)

(58) Field of Classification Search
CPC ..................................................... G06T 11/60
See application file for complete search history.

(56) References Cited

U.S. PATENT DOCUMENTS

2006/0232603 A1* 10/2006 Schuster ................. G06T 11/60
345/619
2009/0297031 A1* 12/2009 Pettigrew ............... G06K 9/342
382/195

OTHER PUBLICATIONS

Adobe.com; "Demystifying Gaussian blur"; Date downloaded Oct. 26, 2020; https://www.adobe.com/creativecloud/photography/discover/gaussian-blur.html.
Wikipedia: The Free Encyclopedia; "Median filter"; Date downloaded Oct. 26, 2020; https://en.wikipedia.org/wiki/Median_filter.
Wikipedia: The Free Encyclopedia; "Otsu's method"; Date downloaded Oct. 26, 2020; https://en.wikipedia.org/wiki/Otsu%27s_method.
Wikipedia: The Free Encyclopedia; "Edge detection"; Date downloaded Oct. 26, 2020; https://en.wikipedia.org/wiki/Edge_detection.

* cited by examiner

*Primary Examiner* — Shivang I Patel
(74) *Attorney, Agent, or Firm* — Keller Preece PLLC

(57) ABSTRACT

The present disclosure relates to systems, non-transitory computer-readable media, and methods for generating visual image editing guides for digital raster images by identifying and filtering edge paths. In particular, in one or more embodiments, the disclosed systems utilize denoising and adaptive thresholding with a digital image to generate a simplified, binary digital image. Further, in some embodiments, the disclosed systems utilize contour detection to identify a set of edge paths from the raster image for the simplified, binary digital image. Additionally, in one or more embodiments, the disclosed systems filter the set of edge paths based on edge length and utilizes the filtered set of edge paths to generate visual image editing guides for generating modified digital images.

20 Claims, 13 Drawing Sheets

GENERATING DIGITAL IMAGE EDITING GUIDES BY DETERMINING AND FILTERING RASTER IMAGE CONTENT BOUNDARIES

BACKGROUND

Recent years have seen significant development in hardware and software platforms that utilize digital tools to edit digital images. For example, conventional content management systems can create and edit a variety of digital objects within digital images to create elaborate visual scenes. To illustrate, some conventional content management systems can move, rotate, resize, or otherwise transform vector objects within a digital image utilizing various snapping tools that assist in aligning user interactions to existing vector objects. For example, conventional content management systems can snap the center of a vector design object to horizontally align with the center of an existing vector design object. Although conventional content management systems provide tools for editing and modifying vector objects in digital images, such systems have a number of technical shortcomings, particularly with regard to accuracy of editing digital images based on the contents of raster graphics, efficiency in processing raster objects, and flexibility in modifying digital design objects within a digital artboard.

BRIEF SUMMARY

Embodiments of the present disclosure provide benefits and/or solve one or more of the foregoing or other problems in the art with systems, non-transitory computer-readable media, and methods for generating digital image editing guides by determining and filtering raster image content boundaries and edges. In particular, in one or more embodiments, the disclosed systems efficiently detect region boundaries in a digital image object to generate real time and interactive visual image editing guides from inside a raster image object. For example, the disclosed systems can process a digital image object to generate a simplified, binary representation of the digital image object. Moreover, the disclosed systems can extract and intelligently filter edge paths from the simplified-binary digital image. The disclosed systems can then utilize these filtered edge paths to generate visual image editing guides for snapping, clipping, cropping, and other editing operations of a digital image. Indeed, in this manner, the disclosed systems can efficiently and accurately generate modified digital images that align to the edges and boundaries of raster digital objects portrayed in digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
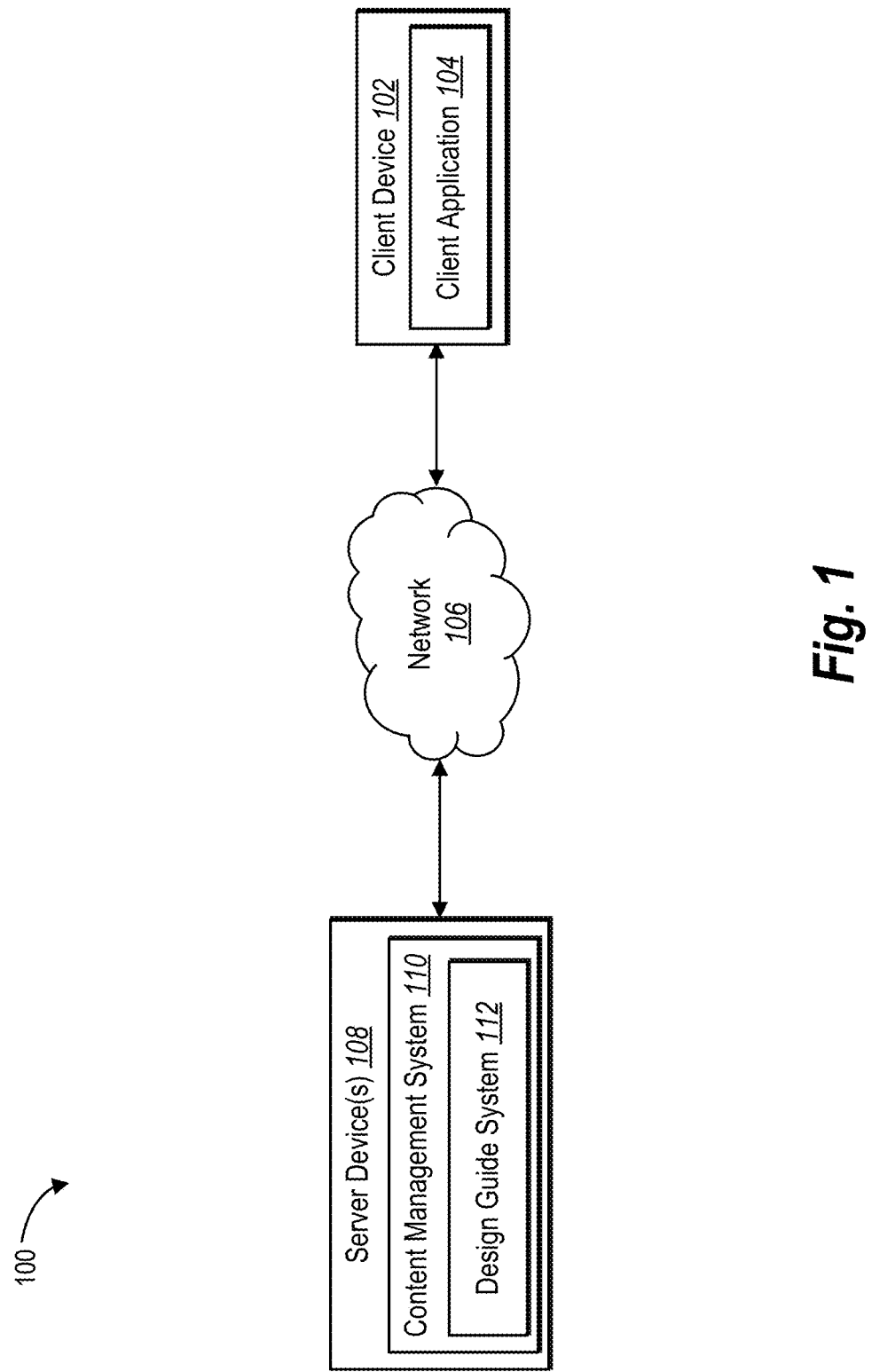
FIG. 1 illustrates a diagram of an environment in which a design guide system can operate in accordance with one or more embodiments.

This disclosure describes one or more embodiments of a design guide system that efficiently, accurately, and flexibly generates visual image editing guides based on a filtered set of edge paths from a digital raster image. More specifically, in one or more embodiments, the design guide system processes a digital image to generate a simplified, binary digital image utilizing denoising and adaptive thresholding. Further, the design guide system can process the simplified, binary digital image to extract a set of edge paths. For example, the design guide system can utilize a contour detection algorithm to efficiently identify a representative set of edge paths from the simplified, binary digital image. Additionally, the design guide system can filter the set of edge paths (e.g., based on enclosing edge paths and edge length) and utilize the filtered set of edge paths to generate visual image editing guides for the digital image. In this manner, the design guide system can efficiently generate visual image editing guides that can accurately and flexibly align digital image modifications to the internal features of various raster objects.

As just mentioned, in one or more embodiments, the design guide system generates a simplified, binary digital image corresponding to a digital image. More specifically, in some embodiments, the design guide system processes a digital image (or digital object portrayed in a digital image) utilizing a denoising algorithm to remove irregular content from a digital image. Further, in one or more embodiments, the design guide system utilizes an adaptive thresholding algorithm to binarize the digital image. By generating a simplified, binary digital image, the design guide system can significantly reduce processing complexity and improve the efficiency of identifying visual image editing guides to align to the internal features of a raster image.

Indeed, as mentioned above, in some embodiments, the design guide system extracts a set of edge paths from a simplified, binary digital image. Specifically, in one or more embodiments, the design guide system applies a contour detection algorithm to a binarized digital image to identify a set of contours. Moreover, the design guide system can apply a gap detection and filling algorithm to merge different contours in generating a set of edge paths from the simplified, binary digital image. Accordingly, the design guide system can efficiently extract a set of edge paths that represent the internal features of a raster image. Indeed, by utilizing the foregoing approach, in one or more embodiments, the design guide system can reduce the number of edge paths (and corresponding computing analysis) by over 20 times relative to an analysis of high-fidelity images while still determining edge paths that accurately reflect the significant boundaries of a raster image. Moreover, as discussed in greater detail in FIG. 9, the design guide system can significantly reduce processing time relative to other approaches.

Upon extracting a set of edge paths from a simplified, binary digital image, the design guide system can also intelligently filter the set of edge paths to further refine the significance of edge paths utilized to generate visual editing guides. For example, in some embodiments, the design guide system identifies enclosing closed edge paths from the set of edge paths. To illustrate, in one or more embodiments, the design guide system identifies "outermost" closed edge paths not enclosed by any additional closed edge paths. In one or more embodiments, the design guide system automatically adds enclosing closed edge paths to the filtered set of edge paths utilized to generate visual image editing guides.

Additionally, in some embodiments, the design guide system applies a threshold edge length to remaining edge paths to determine whether to add the remaining edge paths to the filtered set of edge paths. More specifically, in one or more embodiments, the design guide system applies the threshold edge length to enclosed edge paths edge paths (that fall within the enclosing closed edge paths). In some embodiments, if an edge path satisfies the threshold edge length, the design guide system adds the edge path to the filtered set of edge paths.

Further, in one or more embodiments, the design guide system applies the threshold edge length to sets of linear edge paths. More specifically, in some embodiments, the design guide system determines a set of linear edge paths that fall within a linear region of digital images. In one or more embodiments, the design guide system determines a cumulative edge length for the set of linear edge paths and compares the cumulative edge length to the threshold edge length. In some embodiments, if the cumulative edge length satisfies the threshold edge length, the design guide system adds the set of linear edge paths to the filtered set of edge paths.

As mentioned above, upon determining a filtered set of edge paths, in some embodiments, the design guide system generates visual image editing guides. For example, in one or more embodiments, the design guide system can generate linear visual image editing guides that can align to linear portions of the filtered set of edge paths. To illustrate, the design guide system can generate a horizontal snapping guide that aligns a new digital object to a horizontal line of portrayed in a raster object within a digital image. Similarly, the design guide system can generate snapping guides based on one or more boundaries of the filtered set of edge paths. For example, the design guide system can generate a clipping guide or cropping guide that snaps to the outer boundaries (e.g., an enclosing edge path or bounding shape) of a raster object portrayed in a digital image.

In one or more embodiments, the design guide system utilizes the visual image editing guides to facilitate a variety of digital image editing actions. For example, in some embodiments, the design guide system snaps digital objects to the visual image editing guides during digital image editing. Accordingly, in one or more embodiments, the design guide system aligns, translates, rotates, edits, and otherwise transforms digital objects within a digital image relative to the visual image editing guides. In one or more embodiments, the design guide system snaps cursor movements to visual image editing guides (e.g., snaps a cursor to align with a raster object to begin drawing a new line or shape). Moreover, as mentioned, in some embodiments, the design guide system can utilize visual image editing guides in cropping or clipping digital images.

Additionally, in some embodiments, the design guide system dynamically and efficiently modifies the visual image editing guides based on edits to a digital image. Indeed, continually analyzing digital images and corresponding edge paths can impose significant computational costs. Accordingly, in one or more embodiments, the design guide system caches data corresponding to a filtered set of edge paths and visual image editing guides corresponding to a digital image. Moreover, in response to identifying a transformation to the digital image, the design guide system directly applies the transformation to the cached filtered set of edge paths (while avoiding the need to re-extract and filter the edge paths from the digital image). In particular, the design guide system can generate and apply a transformation matrix to cached edge paths to avoid the computational burden of re-processing raster objects in a digital image. Thus, in one or more embodiments, the design guide system utilizes the cached filtered set of edge paths to efficiently and accurately update the visual image editing guides, even when portions of the digital image have been modified.

As suggested above, conventional content management systems exhibit a number of technical deficiencies with regard to accuracy, efficiency, and flexibility. Indeed, conventional content management systems generally only provide alignment guides with regard to vector objects in vector images. Accordingly, in working with raster images or raster objects in digital images, conventional systems fail to provide an accurate approach to aligning user interactions or image editing operations within a digital canvas or artboard. Accordingly, conventional systems are rigidly tied to vector graphics and cannot flexibly accommodate raster images.

It is possible to rely on brute force vectorization to identify all edge paths in a digital raster image. This approach generates a significant number of edge paths that fail to reflect the significant features of objects portrayed in digital images. Indeed, even for simple shapes, conventional edge detection algorithms can generate hundreds of edges that fail to accurately reflect the significant boundaries of a digital image. Accordingly, conventional edge detection algorithms lack accuracy in selecting significant or important boundaries of raster images.

Additionally, such a brute force approach also undermines efficiency of implementing computing systems. Indeed, brute force vectorization of raster images requires excessive time and computing resources to identify the large volume of edge paths. Indeed, identifying and continuously monitoring the large volume edge paths requires undue time and computing resources.

Many conventional content management systems also lack flexibility. For example, some conventional systems utilize a manual approach, where designers place guides around visible boundaries in an image. As an initial matter, this rigid, manual approach is tedious and inefficient. Moreover, if any change is made in the position or appearance of digital objects portrayed in a digital image, such a manual approach cannot flexibly accommodate the revision. Rather, conventional systems require repetition of user input to readjust the boundaries.

Some systems seek to address these concerns by utilizing object detection neural networks (or other machine learning approaches) to process raster images. However, these approaches also suffer from a variety of technical shortcomings. For example, object detection algorithms can detect the outer boundaries of a digital image but fail to detect other important regions or boundaries inside digital objects portrayed in digital images. In addition, machine learning models, such as neural networks, require significant computer processing resources in training and application. In addition, many object detection neural networks or inflexible in that they work well with regard to a particular category of objects (e.g., cats, dogs, or portraits), but cannot flexibly adjust to different categories or abstract images.

The design guide system provides many advantages and benefits over conventional content management systems and methods. For example, by generating visual image editing guides based on a filtered set of edge paths, the design guide system improves accuracy relative to conventional content management systems. More specifically, the design guide system generates a simplified, binary digital image that emphasizes significant features of a raster image. Moreover, the design guide system intelligently extracts edge paths from the simplified, binary digital image utilizing an elegant filtering algorithm to further isolate important edge paths, such as outlines of digital objects. Thus, the design guide system generates accurate visual image editing guides corresponding to objects in a digital raster image.

Additionally, the design guide system improves efficiency over conventional content management systems. Indeed, in contrast to machine learning models and high-volume edge detection algorithms, the design guide system requires significantly fewer computing resources. Indeed, generating a simplified, binary digital image and extracting edge paths requires significantly less processing power than neural network approaches or approaches that generate and analyze large volumes of edges. Further, the design guide system can improve efficiency by caching and retrieving filtered sets of edge paths for updating of visual image editing guides. As discussed in greater detail below with regard to FIG. 8, by filtering edge paths and utilizing caching, the design guide system can improve processing speeds by up to ten times relative to a brute force approach.

Further, the design guide system can improve flexibility relative to conventional content management systems. By filtering edge paths to determine important edge paths, the design guide system can accurately identify internal and external boundaries across any variety of digital objects in digital raster images. In addition, the design guide system can flexibly update visual image editing guides in response to a variety of changes in a digital image. Thus, the design guide system can flexibly apply to a variety of digital images categories and contexts in dealing with raster objects portrayed in raster images.

As illustrated by the foregoing discussion, the present disclosure utilizes a variety of terms to describe features and advantages of the design guide system. Additional detail is now provided regarding the meaning of such terms. For example, as used herein, the term "digital image" refers to refers to any digital symbol, picture, icon, or illustration. For example, the term "digital image" includes digital files with the following, or other, file extensions: JPG, TIFF, BMP, PNG, RAW, or PDF. Further, as used herein, the term "digital raster image" includes a digital image composed of a grid of individual pixels. To illustrate, a digital raster image can include a bitmap of individual pixels that, together, compose a digital image. A digital raster image differs from a digital vector image that is defined by one or more vectors (rather than pixels and corresponding pixel values). Similarly, a digital raster object includes an object comprising a plurality of pixels that illustrate an object.

Also, as used herein, the term "simplified, binary digital image" refers to a digital image that is converted to a binary format and that includes a subset of edges portrayed in the digital image (e.g., important edge paths). To illustrate, a simplified, binary digital image can include a version of a digital image generated after utilization of a denoising algorithm, adaptive thresholding, and contour detection to identify important edge paths.

Additionally, as used herein, the term "edge length" refers to a dimensional measure of an edge path. In particular, an edge length can refer to a length (or combined length) of the prominence of an edge path within a digital image. To illustrate, "edge length" can refer to a measure of importance of an edge path within a digital image based on the visual prominence of the edge path, including length (and/or width). Further, as used herein, the term "threshold edge length" refers to an edge length limit or tolerance. To illustrate, "threshold edge length" can refer to a measure of importance in a digital image necessary for inclusion in a set of filtered edge paths for generation of visual image editing guides. To illustrate, the design guide system can utilize a threshold edge length to determine the importance of an edge path for generation of a visual image editing guide based on the visual prominence of the edge path.

Additionally, as used herein, the term "edge path" refers to an edge or boundary (internal or external) of a digital image. In particular, an edge path can include a vector representation of a change in image brightness and/or color of a raster image. To illustrate, an edge path can include a line or curve representing a difference in color and/or brightness from a digital raster image. For example, an edge path can include one or more Bezier curves and/or one or more straight lines. In other embodiments, an edge path includes other representations of curved/straight lines including Hermite curves, B-splines, non-uniform rational basis splines, Kappa-curves, Catmull-Rom splines or another parameter curve.

Relatedly, as used herein, the term "open edge path" refers to an edge path including an open segment. To illustrate, in some embodiments, an open edge path has one or more endpoints. Additionally, the term "closed edge path" refers to an edge path comprising a closed segment (e.g., an edge path begins and ends at the same vertex or point).

Further, as used herein, the terms "enclosing closed edge path" (or "encompassing closed edge path") refers to a closed edge path that surrounds one or more edge paths and/or is not enclosed by any other closed edge path. Relatedly, as used herein, the term "enclosed edge path" refers to an edge path located within (e.g., surrounded by) an enclosing closed edge path.

Further, as used herein, the term "linear edge path" refers to an edge path comprising a linear segment. For example, a linear edge path can include a linear Bezier curve between two points. As mentioned above, in some embodiments, the design guide system identifies a set of linear edge paths within a linear region. As used herein, the term "linear region" refers to a measure of parallelism and/or collinearity of linear segments. For example, two linear edge paths can fall within the same linear region if they fall within a threshold angular range (e.g., they have a similar orientation) and/or a threshold range of collinearity.

Also, as used herein, the term "bounding shape" refers to a shape that surrounds a digital object in a digital image. In particular, the term "bounding shape" can include a shape outlining a digital image generated by the design guide system based on a filtered set of edge paths and/or corresponding visual image editing guides. To illustrate, a bounding shape can include a bounding box outlining a rectangle surrounding a digital object, an oval surrounding a close outline of a digital object, and/or an irregular shape outlining a digital object.

Additionally, as used herein, the term "visual image editing guide" refers to a digital element for aligning a user interaction or image editing operation. In particular, a visual image editing guide can include a visual indicator for aligning or snapping a user interaction or editing operation to a digital object (or edge path). For example, a visual image editing guide can include a snapping guide for rotating, translating, clipping, cropping, or drawing within a canvas or artboard portraying digital image. As described above, the design guide system can provide visual image editing guides that align to the internal or external boundaries of raster images or raster objects.

Additional detail regarding the design guide system will now be provided with reference to the figures. For example, FIG. 1 illustrates a schematic diagram of an example system environment 100 (or "system 100") for implementing a design guide system 112 in accordance with one or more embodiments. Specifically, FIG. 1 illustrates the system 100 including a client device 102, a client application 104, a network 106, server device(s) 108, a content management system 110, and a design guide system 112. Although FIG. 1 illustrates one client device, in alternative embodiments, the system 100 includes a different number of client devices and corresponding users. Similarly, although FIG. 1 illustrates a particular arrangement of the client device 102, the network 106, the server device(s) 108, and the third-party server(s), various arrangements are possible.

As shown in FIG. 1, the client device 102 includes the client application 104. As discussed below with regard to FIG. 12, in one or more embodiments, the client device 102 includes a variety of types of computing devices. In some embodiments, the client application 104 includes one or more software applications that allow a corresponding user to view, manage, modify, edit, generate, send, and/or receive digital content. For example, in some embodiments, the client application 104 is a software application installed on the client device 102 or a web-based application accessed via the server device(s) 108.

Figure 12:
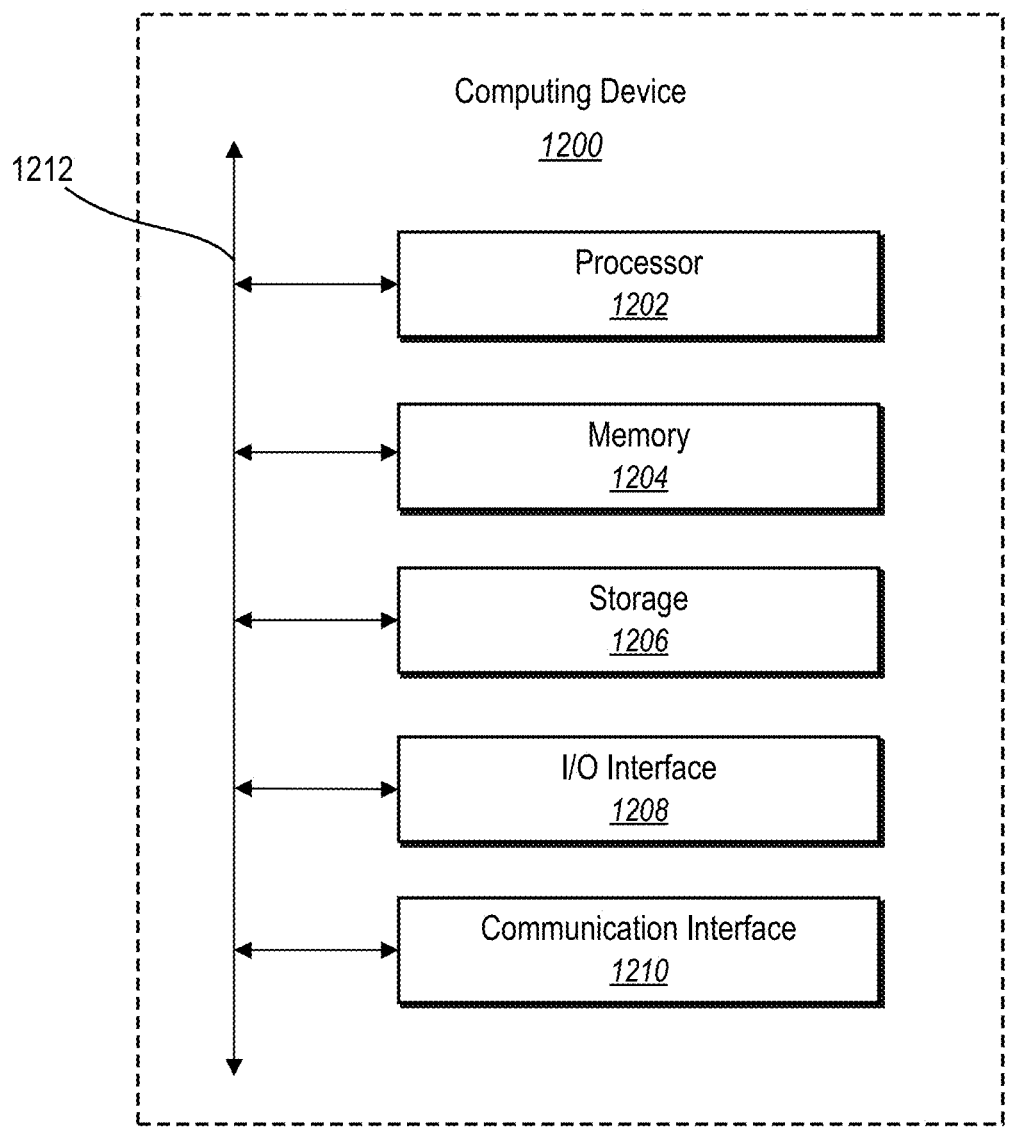
FIG. 12 illustrates a block diagram of an example computing device for implementing one or more embodiments of the present disclosure.

As further shown in FIG. 1, the client device 102 and the server device(s) 108 may be communicatively coupled with each other directly or indirectly, such as coupling through the network 106, which is described further in relation to FIG. 12. The client device 102 and the server device(s) 108 may include a variety of computing devices, including one or more computing devices as discussed further below in relation to FIG. 12. In some embodiments, the server device(s) 108 comprise a data server, a communication server, or a web-hosting server and generates, stores, receives, and/or transmits a variety of types of data, including digital images and/or modifications to digital images. In certain implementations, the client device 102 comprises a computing device that allows a corresponding user to generate, edit, receive, and/or send digital images including digital objects.

Additionally, as shown in FIG. 1, the server device(s) 108 includes the content management system 110 and the design guide system 112. In general, the content management system 110 facilitates the storage, rendering, and maintenance of various types of digital content. For example, the content management system 110 manages digital images including digital objects. Among other things, in some implementations, the content management system 110 provides digital images to the design guide system 112.

In addition to management of various digital content, as shown in FIG. 1, the content management system 110 includes the design guide system 112. In some embodiments, the design guide system 112 generates, manages, and utilizes visual image editing guides for digital images, including digital raster images. More specifically, in one or more embodiments, the design guide system 112 determines and filters edge paths from digital raster images. In some embodiments, the design guide system 112 utilizes those filtered edge paths to generate visual image editing guides. Further, in one or more embodiments, the design guide system 112 provides suggestions, visual guides, and other image editing assistance based on the visual image editing guides.

As illustrated, the design guide system 112 may be implemented by the individual elements of the system 100. Although FIG. 1 illustrates the design guide system 112 implemented within the server device(s) 108, in one or more alternative embodiments, the components of the design guide system 112 are implemented in other components of the system 100. For instance, in some embodiments, the client device 102 implements the design guide system 112 and performs (in whole or in part) the functions, methods, and processes of the design guide system 112.

As discussed above, in some embodiments, the design guide system 112 generates visual image editing guides for a digital raster image based on a simplified, binary digital image. For instance, FIG. 2A illustrates an analysis of a digital raster image utilizing a high-fidelity image and edge detection algorithm and FIG. 2B illustrates the design guide system 112 generating visual image editing guides from a simplified, binary digital image in accordance with one or more embodiments.

As mentioned above, it is possible to use a brute-force vectorization approach that identifies a variety of edge paths in a digital raster image without differentiation between edge paths. FIG. 2A illustrates such an approach, including an unoptimized vectorization path output 204 generated from an original raster image 202. Although illustrated in black and white in FIG. 2A, the original raster image 202 includes a color gradient across a logo.

Figure 2A:
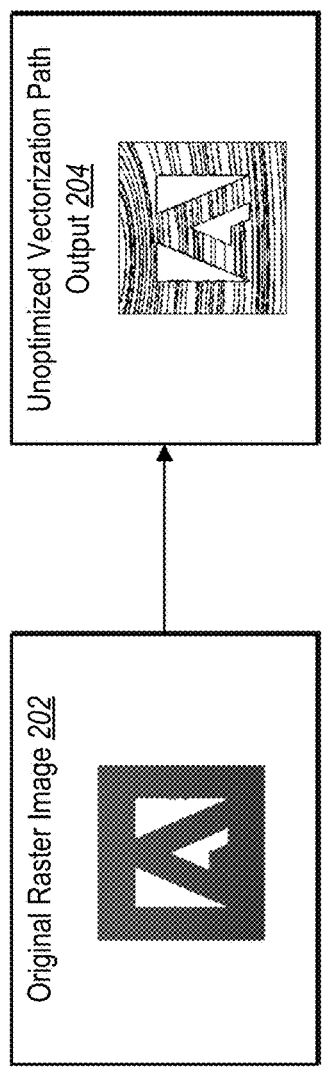
FIGS. 2A-2B illustrate a diagram of generating a simplified, binary digital image and visual image editing guides in accordance with one or more embodiments.

As shown in FIG. 2A, the unoptimized vectorization path output 204 includes a variety of identified edge paths along the gradient of color included in the original raster image 202. Indeed, because the color of the original raster image 202 gradually changes along the color gradient, the brute force approach generates a large volume of edges in an effort to approximate the color gradient. However, a majority of the edge paths detected in the unoptimized vectorization path output 204 are not representative of significant boundaries of the original raster image 202. Thus, identification of each of these edge paths is inefficient and further fails to lead to any accurate representation of the boundaries of the original raster image 202.

Figure 2B:
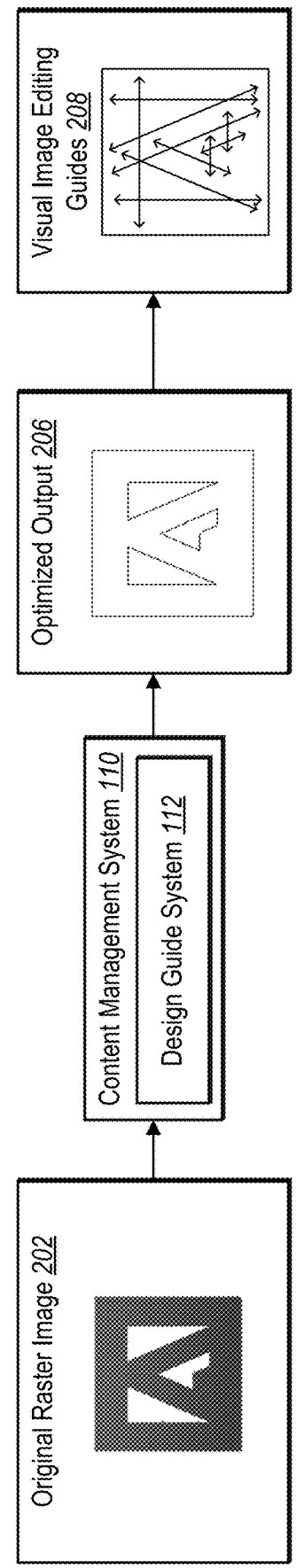

FIG. 2B illustrates the design guide system generating a simplified, digital binary image to generate visual image editing guides for a digital raster image in accordance with one or more embodiments. More specifically, FIG. 2B illustrates the design guide system 112 processing the original raster image 202 to generate the optimized output 206. More specifically, the design guide system 112 generates a simplified, binary digital image including important edge paths relevant for generating visual image editing guides. In contrast to the unoptimized vectorization path output 204, the optimized output 206 does not include a large volume of edge paths reflecting the color gradient of the original raster image 202 that are not helpful or significant for digital image editing.

More specifically, in some embodiments, the design guide system 112 filters edge paths based on edge length to generate a simplified, binary digital image comprising a filtered set of edge paths. Accordingly, in one or more embodiments, the design guide system 112 generates visual image editing guides for the original raster image 202 based on the filtered set of edge paths in the simplified, binary digital image. Thus, the design guide system 112 can generate visual image editing guides based on significant edge paths that are more efficient and accurate for aligning user interactions in digital image editing.

For example, as shown in FIG. 2, the design guide system 112 generates visual image editing guides 208 based on the edge paths in the optimized output 206. Indeed, the design guide system 112 can generate some of the visual image editing guides 208 by generating bounding boxes from the edge paths (e.g., closed edge paths) of the optimized output 206. Similarly, the design guide system 112 can generate some of the visual image editing guides 208 by generating linear visual image editing guides from linear segments of edge paths in the optimized output 206. To illustrate, the design guide system 112 can extend linear segments of edge paths as rays or lines that extend into a digital canvas.

Furthermore, the design guide system 112 can modify the original raster image 202 based on user interaction with the visual image editing guides 208. For example, in one or more embodiments, the design guide system 112 aligns user interactions within the digital canvas to the visual image editing guides 208. For example, when a user moves a cursor, the design guide system 112 can snap the cursor to align with one of the visual image editing guides 208 (if the cursor is within a snapping tolerance of the visual image editing guide). Similarly, the design guide system 112 can generate new digital objects to align with the visual image editing guides 208 and/or move existing digital objects within the digital image to align to the visual image editing guides 208. Furthermore, the design guide system can align a crop or clip action to the visual image editing guides (e.g., align a clipping function to a bounding shape of the edge paths from the optimized output 206). Thus, in some embodiments, the design guide system 112 provides accurate alignment between edge paths in digital raster images, including internal edge paths of raster images that conventional systems could not address.

Figure 3:
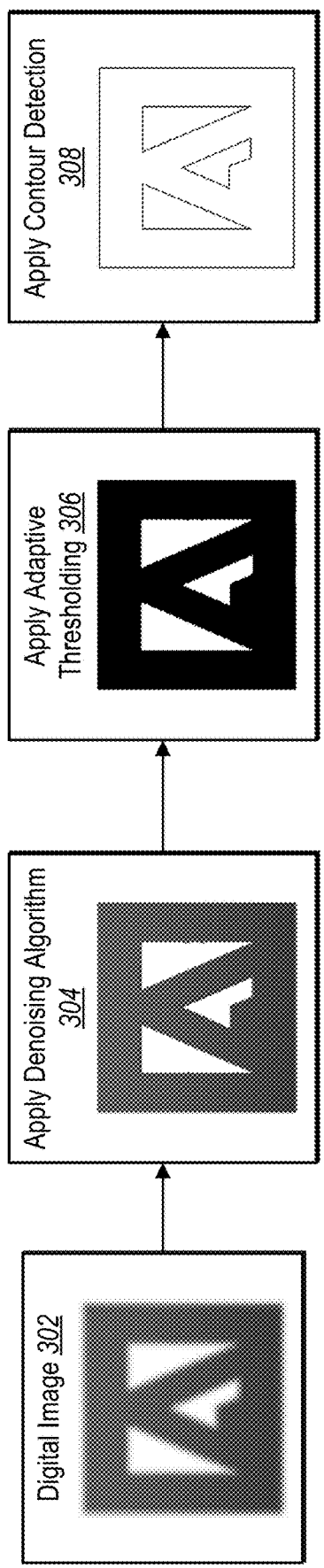
FIG. 3 illustrates a diagram of generating a simplified, binary digital image in accordance with one or more embodiments.

As mentioned, in some embodiments the design guide system 112 generates a simplified, binary digital image based on a digital raster image. FIG. 3 illustrates additional detail for the process of generating a simplified, binary digital image. As shown in FIG. 3, the design guide system 112 receives a digital image 302. As discussed above briefly, the design guide system 112 can detect edge paths and generate visual image editing guides for raster images, including digital images utilizing bitmaps to store information as pixels. For example, in one or more embodiments, the digital image 302 can include a file format such as .BMP, .TIF, GIF, and/or .JPG.

As shown in FIG. 3, in one or more embodiments, the design guide system 112 performs the act 304 of applying a denoising algorithm. More specifically, as shown in FIG. 3, the design guide system 112 applies a denoising algorithm to the digital image 302. Accordingly, the edge paths in the digital image are clearer and more distinct. The design guide system 112 utilizes the denoising algorithm to remove disruption and/or irregular content from the digital image 302. More specifically, in one or more embodiments, the design guide system 112 utilizes a denoising algorithm to differentiate between noise, texture, and edge paths in the digital image 302 in order to remove noise from an image while retaining the texture and edge paths in the digital image 302. In one or more embodiments, the design guide system 112 utilizes a Gaussian Blurring and/or Median blurring techniques to remove noise from the digital image 302. Additionally, in some embodiments, the design guide system 112 utilizes adaptive window size in denoising to improve maintenance of original texture from the digital image 302.

As also shown in FIG. 3, in one or more embodiments, the design guide system 112 performs an act 306 of applying an adaptive thresholding algorithm. In some embodiments, the design guide system 112 applies the adaptive thresholding algorithm to the digital image 302 after applying the denoising algorithm. As shown in FIG. 3, the design guide system 112 utilizes the adaptive thresholding algorithm to generate a simplified, binary digital image based on the digital image 302.

More specifically, the design guide system 112 utilizes adaptive thresholding to binarize the digital image 302 based on a threshold shade value. In some embodiments, the design guide system 112 utilizes adaptive thresholding to determine thresholds for various regions of the digital image 302 in order to binarize the digital image 302. By binarizing the digital image, the design guide system 112 generates a simplified, binary digital image with clear edge paths.

In one or more embodiments, the design guide system 112 utilizes an Otsu algorithm to binarize the digital image 302 and generate the simplified, binary digital image. To illustrate, in one or more embodiments, the design guide system 112 utilizes a grayscale digital image and applies an adaptive threshold to each pixel to determine color in the simplified, binary digital image. More specifically, the design guide system utilizes the adaptive thresholding algorithm to determine an individual threshold for each pixel in the grayscale digital image based on the image gradient near the pixel. Thus, in some embodiments, the design guide system utilizes the adaptive thresholding algorithm to accurately generate the simplified, binary digital image based on different regions of shades in the grayscale digital image.

As further shown in FIG. 3, the design guide system 112 performs an act 308 of applying contour detection. More specifically, in some embodiments, the design guide system 112 applies a contour detection algorithm to the binarized digital image to generate a simplified, binary digital image including a set of edge paths. As shown in FIG. 3, the simplified, binary digital image includes a set of edge paths corresponding to the digital image 302. In some embodiments, the design guide system 112 utilizes a contour detection algorithm to generate contours from the simplified, binary digital image. More specifically, in one or more embodiments, the design guide system 112 utilizes a Canny, Deriche, differential, Sobel, Prewitt, and/or other edge detection as a contour detection algorithm.

In one or more embodiments, in addition to applying a contour detection algorithm, the design guide system 112 applies gap detection and a filling algorithm to the detected contours to generate the set of edge paths. Accordingly, in some embodiments, the design guide system 112 joins contours to form closed edge paths for the set of edge paths in the simplified, binary digital image. In one or more embodiments, the design guide system 112 utilizes a polygon filling algorithm, a scan line algorithm, a flood fill algorithm, a boundary fill algorithm, and/or another gap detection and filling algorithms.

More specifically, in one or more embodiments, the design guide system 112 applies gap detection to the set of edge paths to detect gaps or small breaks between edge paths. Then, in some embodiments, the design guide system 112 applies the filling algorithm to determine, whether to fill the gap to combine the edge paths. More specifically, in one or more embodiments, the design guide system 112 determines whether to fill a gap based on the size of the gap, and/or the orientation of the edge paths with the gap.

Although FIG. 3 illustrates a particular approach to determining edge paths, the design guide system 112 can also utilize other approaches to determine significant edge paths. Indeed, in some embodiments the design guide system 112 identifies important edge paths in a digital image utilizing optimized vectorization. More specifically, in one or more embodiments, the design guide system 112 sets parameters for vectorization to identify the most relevant edge paths. To illustrate, in some embodiments, the design guide system 112 sets a black and white mode for determination of Bezier paths. Thus, the design guide system 112 assigns two colors for vectorized paths to generate only important edge paths. More specifically, the design guide system 112 can utilize a threshold of 128 (or similar threshold) on a scale of 0 to 255. In one or more embodiments, the design guide system 112 sets a high tolerance value and high noise reduction parameter to generate relevant Bezier paths in order to determine the important edge paths.

Figure 4:
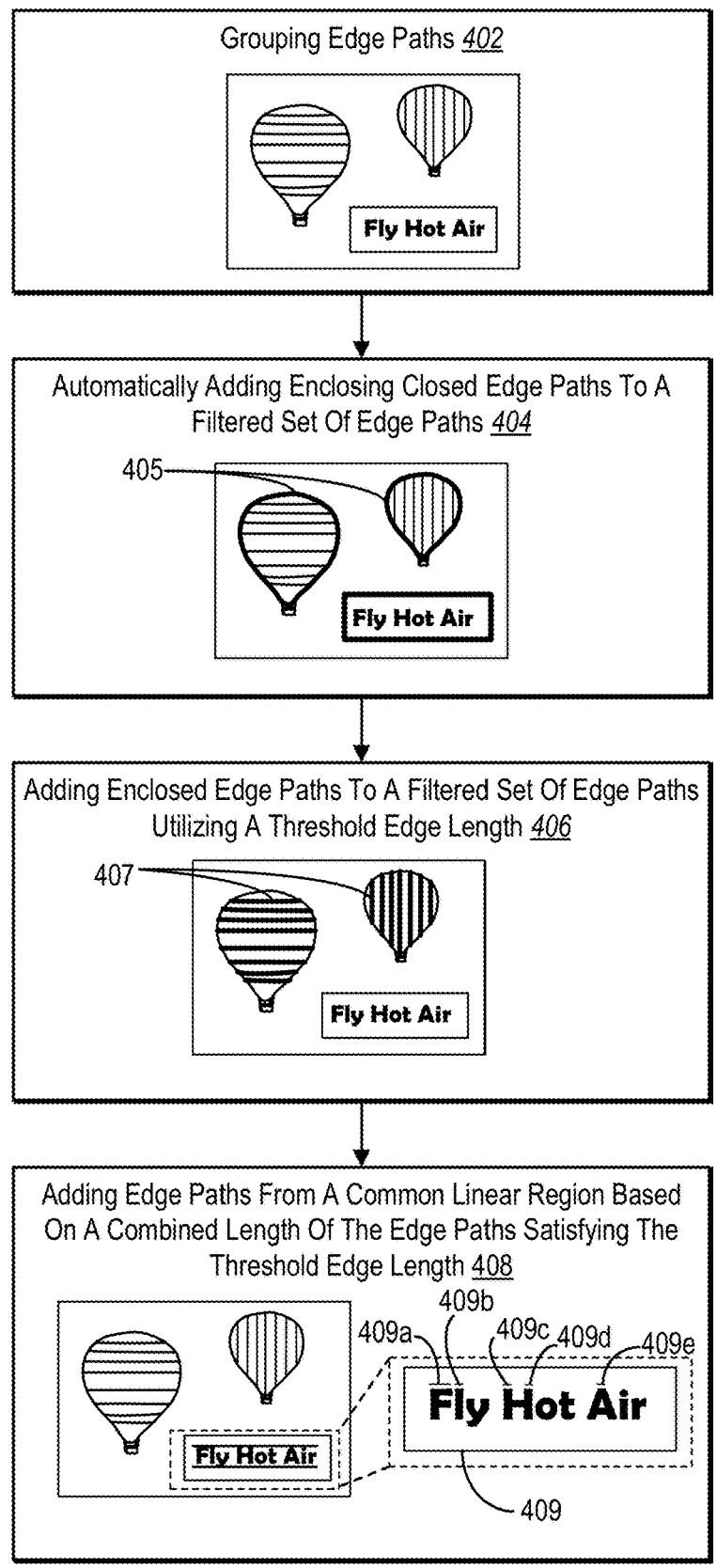
FIG. 4 illustrates a diagram of filtering a set of edge paths in a digital image in accordance with one or more embodiments.

To illustrate, in some embodiments, the design guide system 112 utilizes the following computer-implemented algorithm:
1. Set the following Vectorization tracing parameters into the vectorize lib to obtain high speed internal conversion of raster bitmap image to path segments:
   a. Set the Black and White mode to the color space such only the visible key boundaries of the image are traced into Bezier paths
   //This can prevent spending time in determining the color space of the vectorized paths and assign only 2 of the available colors to get only distinguished paths in the output
   b. Set BlackNWhite Threshold to 128 from the range of 0 to 255 which is responsible for the luminance factor of the traced paths.
   c. Set contourDetails related to the path fidelity criteria to half the available range
   d. Set a high tolerance value to snap to lines while path and curve fitting process
   e. Set a high noise reduction parameter to remove irrelevant paths from being created
2. Send the image to vectorize lib with these parameters to obtaining the Bezier path segments from representing the image
3. Return a combined group of all the obtained path Arts As mentioned above, in one or more embodiments, the design guide system 112 filters the set of edge paths to generate a filtered set of edge paths. FIG. 4 illustrates the design guide system 112 filtering a set of edge paths in accordance with one or more embodiments. More specifically, FIG. 4 illustrates a series of acts 402-406 performed by the design guide system 112 in generating a filtered set of edge paths. As shown in FIG. 4, the design guide system 112 filters edge paths corresponding to a simplified, binary digital image of two hot air balloons with the text "Fly Hot Air."

As shown in FIG. 4, in some embodiments, the design guide system 112 performs an act 402 of grouping edge paths (e.g., based on different types of edge path). For example, the design guide system can identify enclosing closed edge path and enclosed edge paths. In one or more embodiments, by grouping the set of edge paths, the design guide system 112 efficiently filters the set of edge paths by group. For instance, as shown in FIG. 4, the design guide system 112 identifies two enclosing closed edge paths corresponding to the boundary of each hot air balloon and also identifies an enclosing closed path comprising the rectangle surrounding the text "Fly Hot Air." Further, the design guide system 112 identifies a set of edge paths within each enclosing closed edge path corresponding to a hot air balloon and a set of edge paths inside the rectangle including the text "Fly Hot Air." Thus, the design guide system 112 records a group of edge paths inside the first hot air balloon, a group of edge paths inside the second hot air balloon, and a group of edge paths inside the rectangle. In some embodiments, the design guide system 112 identifies enclosing closed edge paths for grouping edge paths by identifying "outermost" closed edge paths (i.e., closed edge paths that are not enclosed by any other closed edge path). Further, in one or more embodiments, the design guide system 112 identifies a variety of shapes, sizes, and types of edge paths to group within an enclosing edge path (e.g. both open edge paths and closed edge paths).

Also, as shown in FIG. 4, in some embodiments, the design guide system 112 performs an act 404 of automatically adding enclosing closed edge paths 405 to a filtered set of edge paths. Enclosing closed edge paths often constitute the outermost edge path of some feature of a digital image, such as a digital object in the digital image. Accordingly, in one or more embodiments, the design guide system 112 adds the enclosing closed edge path to the filtered set of edge paths without regard to the edge length of an enclosing closed edge path. Thus, in FIG. 4, the design guide system 112 adds the enclosing closed edge paths 405 (shown in bold) to the filtered set of edge paths.

As further shown in FIG. 4, in one or more embodiments, the design guide system 112 performs an act 406 of adding enclosed edge paths 407 to a filtered set of edge paths utilizing a threshold edge length. Accordingly, for the simplified, binary digital image shown in FIG. 4, the design guide system 112 filters the enclosed edge paths 407 in the hot air balloons and the rectangle. In particular, the design guide system 112 compares a length of each enclosed edge path to the threshold edge length. Based on whether the edge length of each edge path satisfies the threshold edge length, the design guide system 112 determines whether to add the edge path to the filtered set of edge paths.

In some embodiments, the design guide system 112 applies a threshold edge length to filter the set of edge paths. In one or more embodiments, the threshold edge length indicates a minimum length (and/or width) of an edge path for inclusion in a filtered set of edge paths. In one or more embodiments, the design guide system 112 can set and/or modify the threshold edge length based on user input at a client device. In addition or in the alternative, in some embodiments, the design guide system 112 determines the threshold edge length. For example, the design guide system 112 can automatically determine the threshold edge length based on a distribution of edge lengths in the image (e.g., to capture 50% of the edges in the digital image). Similarly, in one or more embodiments the design guide system 112 determines the threshold edge length based on a number of edge paths and/or a percentage of edge paths in the digital image. Further, in some embodiments, the design guide system 112 utilizes a target or desired size for a filtered set of edge paths to select a threshold edge length (e.g., modify the threshold edge length such that a total of 20 filtered edge paths result).

The design guide system 112 can apply the threshold edge length to a variety of types of enclosed edge paths. In some embodiments, the design guide system 112 applies the threshold edge length to closed edge paths or open edge paths that are enclosed by an encompassing closed edge path. Accordingly, regardless of type, in one or more embodiments, the design guide system 112 identifies a subset of the enclosed edge paths 407 that satisfy the threshold edge length. Accordingly, the design guide system 112 adds the subset of the enclosed edge paths 407 to the filtered set of edge paths.

In one or more embodiments, the design guide system also adds enclosing closed edge paths (from the act 404) to the filtered set of edge paths by applying a threshold edge length. More specifically, the design guide system 112 determines the edge length of an enclosing closed edge path and determines whether the edge length satisfies a threshold edge length. In one or more embodiments, if the design guide system 112 determines that the enclosing closed edge path satisfies the threshold edge length, the design guide system 112 adds the enclosing closed edge path to the filtered set of edge paths.

Also, as shown in FIG. 4, in some embodiments, the design guide system 112 performs an act 408 of adding edge paths from a common linear region based on a combined length of the edge paths satisfying the threshold edge length. In one or more embodiments, based on the determination that a set of linear edge paths are located within a common linear region, the design guide system 112 filters the set of linear edge paths cumulatively. To illustrate, in FIG. 4, the design guide system 112 identifies that the tops 409a-409e of the letters 409 in "Fly Hot Air" have a common linear region. More specifically, the design guide system 112 identifies multiple small linear edge paths that fall within a shared linear region. Accordingly, the design guide system 112 adds these edge paths to the filtered set of edge paths.

In one or more embodiments, the design guide system 112 identifies linear edge paths within a shared linear region based on both proximity (e.g., signed distance) and similar orientation. To illustrate, in some embodiments, the design guide system 112 identifies linear edge paths in a shared linear region by determining that the linear edge paths are both within a threshold orientation and within a threshold distance from one another. To illustrate, with regard to FIG. 4, the design guide system 112 determines that the linear segment 409a is parallel to (or within a threshold angle deviation) of the linear segment 409b. The design guide system 112 also determines that the linear segment 409a and the linear segment 409b are within a threshold signed distance (e.g., a perpendicular linear from the linear segment 409a to the linear segment 409b is within a threshold distance or a perpendicular linear from a common reference point to linear segments is within a threshold distance difference) utilizes contour detection, as discussed above, to determine location and orientation of linear edge paths within a digital image.

In some embodiments, the design guide system 112 determines a linear region by extending a linear segment and offsetting the linear segment. For example, the design guide system 112 can extend the linear segment 409a (e.g., to the edges of a digital canvas). The design guide system 112 can then offset the extended linear segment (e.g., offset by 20 pixels in both perpendicular directions). The design guide system 112 can then analyze this area for other linear segments that fall within a threshold orientation. Linear segments that satisfy the threshold orientation within the designated are deemed to fall within the common linear region.

In response to determining a set of linear edge paths that fall within a common linear region, the design guide system 112 can determine a combined length for the set of linear edge paths. To illustrate, the design guide system 112 combines the lengths of linear edge paths that form the tops of the each of the letters. The design guide system 112 can compare the combined length for the set of linear edge paths with the threshold edge length. Accordingly, the design guide system 112 determines whether the combined length for the set of linear edge paths satisfies the threshold edge length. In one or more embodiments, if the combined length for the set of linear edge paths satisfies the threshold edge length, the design guide system 112 adds the set of linear edge paths to the filtered set of edge paths.

In one or more embodiments, the threshold edge length utilized for a combined edge length of linear paths in the same linear regions can be different than other thresholds. To illustrate, in one or more embodiments, the threshold edge length utilized in the act 408 is different from the threshold edge length utilized in the act 406 and/or the act 404. Accordingly, the design guide system 112 can flexibly assess different kinds of edge paths in a simplified, binary digital image.

In one or more embodiments, the design guide system 112 utilizes the following computer-implemented algorithm to filter the edge paths:
1. Boundaries are grouped based on containment inside the closed path. Each group is denoted by the outermost closed path ($G_i$) where each $G_i$ contains multiple boundaries or paths $p_{ij}$.
2. Each $G_i$ is marked important and each group denoted by $G_i$, is then processed separately.
3. All the open paths and closed paths of its contained group $G_i$, whose width is greater than some threshold t is also marked important.
4. If multiple small linear paths fall in the same linear region such that their cumulative width is greater than threshold t, then all these small linear paths are also marked important. All the above steps will run recursively to decide the relative weight score. At the end, all the open and closed paths which have not been marked important are removed.

Further, as indicated above, in one or more embodiments, the design guide system 112 determines a weight score for edge paths utilizing the above algorithm. To illustrate, in some embodiments, the design guide system 112 recursively analyzes the edge paths to determine a relative weight score. For example, the design guide system 112 can determine an importance weight based on the number of times an edge path is marked important. Accordingly, in one or more embodiments, the design guide system 112 assigns importance scores to the edge paths and compares the edge paths to an importance threshold. Thus, in some embodiments, the design guide system 112 adds edge paths to the set of filtered edge paths based on the importance score satisfying the importance threshold.

In one or more embodiments, the design guide system 112 further utilizes a filtered set of edge paths to generate visual image editing guides corresponding to a digital raster image. For example, the design guide system 112 generates visual image editing guides along edge paths from a filtered set of edge paths. In some embodiments, the design guide system 112 utilizes edge paths (e.g., open edge paths or closed edge paths) from the filtered set of edge paths to generate visual image editing guides including bounding shapes and/or linear visual image editing guides.

More specifically, in one or more embodiments, the design guide system 112 utilizes a linear direction of an edge path in a digital image to generate a corresponding linear image editing guide (e.g. a linear visual image editing guide). To illustrate, in some embodiments, the design guide system 112 determines a linear direction of an edge path. Further, the design guide system 112 generates a linear image editing guide with the same linear direction of the edge path. To illustrate, in one or more embodiments, the design guide system 112 generates the visual image editing guide extending out beyond the boundaries of the corresponding object in the direction of the edge path. Additionally, in one or more embodiments, the design guide system 112 generates the linear image editing guide at the same location as the edge path with regard to the digital image.

In addition or in the alternative, the design guide system 112 removes edge paths in generating a filtered set of edge paths based on vectorization output. For example, the design guide system 112 can calculate the edge length of the edge paths and remove edge paths that do not satisfy the threshold edge length. Further, in one or more embodiments, the design guide system removes open edge paths that do not intersect any closed edge paths.

Figure 5:
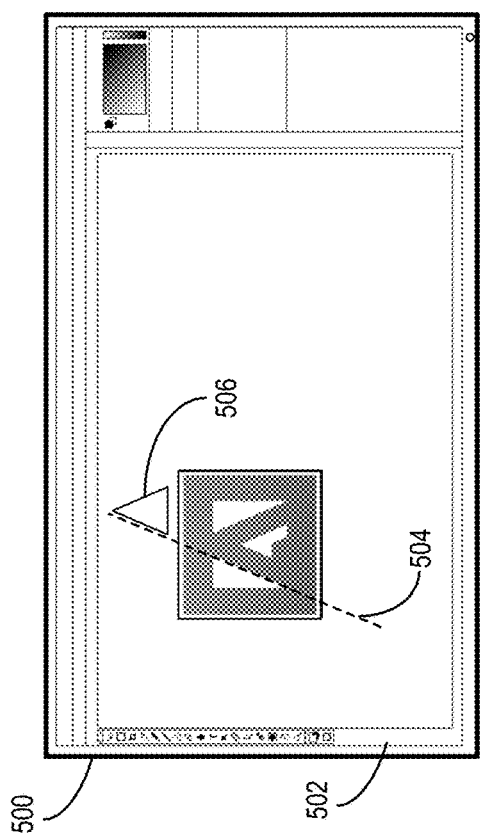
FIG. 5 illustrates a diagram of generating a modified digital image utilizing visual image editing guides in accordance with one or more embodiments.
Figure 5:
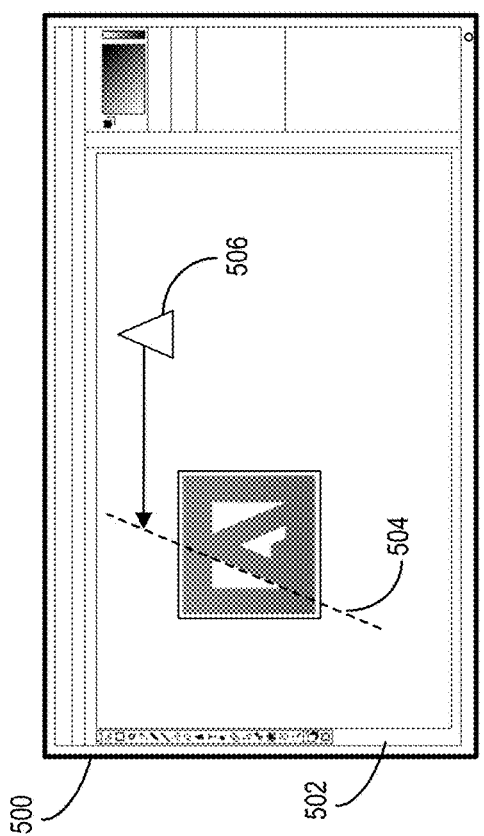

In one or more embodiments, the design guide system 112 utilizes the following computer-implemented algorithm to extract relevant edge paths:
Algorithm: ExtractRelevantVisibleBoundaries ( . . . )_ _
1. Filter out the paths from the vectorization output based on following criteria:
   a. For each path art retrieved from phase 1
     i. size=calculate the size of path art
     ii. if(size is below minimum threshold in comparison with the placed image dimension)
       1. Remove it from the group
       2. //This will remove any noisy paths that may have been created due to the noise in raster image if the ratio is small enough
     iii. else if(art is an open art)
       1. //In most of the artworks open paths don't make relevance
       2. Accordingly filter out and remove those open paths which intersect with any of the relevant closed paths in the image
       3. Containment and Exclusion from the closed paths of the open paths is not ignored.
       4. Only the intersected paths are removed As mentioned, in one or more embodiments, the design guide system 112 generates a modified digital image based on user interaction with visual image editing guides within a digital image. FIG. 5 illustrates a client device 500 including a graphical user interface 502. More specifically, FIG. 5 illustrates the design guide system 112 generating a modified digital image by snapping a digital object 506 onto a visual image editing guide 504 based on user interaction with the visual image editing guide 504. More specifically, the design guide system 112 snaps a digital object 506 onto the visual image editing guide 504 based on proximity of the digital object 506 to the visual image editing guide 504 during a transformation.

As shown in FIG. 5, in one or more embodiments, the design guide system provides the visual image editing guide 504 in the graphical user interface 502. In some embodiments, the design guide system provides the visual image editing guide 504 for display in the graphical user interface 502 based on user interaction with the digital object 506. To illustrate, in some embodiments, the design guide system 112 provides the visual image editing guide 504 for display in the graphical user interface 502 based on determining that the transformation of the digital object 506 is within a threshold distance from the visual image editing guide 504. In addition or in the alternative, the design guide system provides the visual image editing guide 504 based on receiving user interaction with a digital object having an edge path with an orientation the same and/or similar to the visual image editing guide 504.

Additionally, as shown in FIG. 5, based on receiving user input translating the digital object 506 near to the visual image editing guide 504 (e.g., within a snapping tolerance), the design guide system 112 snaps the digital object 506 onto the visual image editing guide 504. Thus, the design guide system 112 generates a modified digital image including the digital object 506 in alignment with the angular linear edge path corresponding to the visual image editing guide 504. However, while FIG. 5 illustrates the design guide system 112 generating a modified digital image based on a translation of the digital object 506, it will be appreciated that the visual image editing guide can generate a modified digital image based on a variety of transformations (e.g., rotation, scaling, warping, or other edits) and/or interactions at and/or near a visual image editing guide.

To illustrate, in some embodiments, the design guide system 112 determines that a cursor or other user interaction comes within a threshold distance of a visual image editing guide. Based on determining that the cursor and/or transformed digital object comes within the threshold distance of the visual image editing guide, the design guide system 112 automatically moves the cursor and/or transformed digital object onto the visual image editing guide. Accordingly, the design guide system can snap a digital object onto a visual image editing guide based on a translation, rotation, scaling, re-shaping, generating (e.g. drawing), operation causing the digital object to come within the threshold distance of the visual image editing guide. Moreover, the design guide system can even snap a cursor or selection (not currently involved in an editing operation) to a visual image editing guide.

Figure 6A:
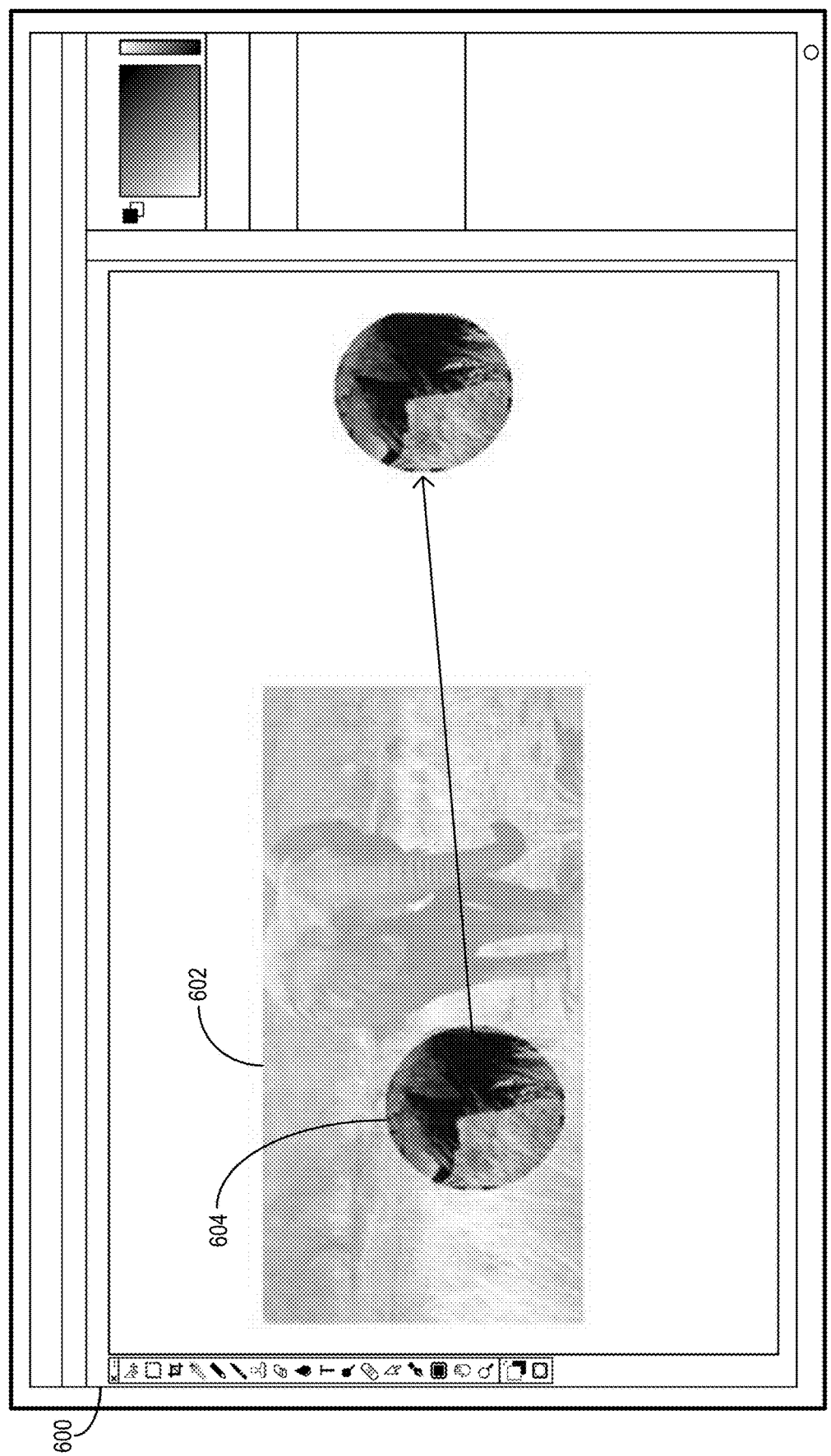
FIGS. 6A-6B illustrate diagrams of clipping digital images utilizing visual image editing guides in accordance with one or more embodiments.
Figure 6B:
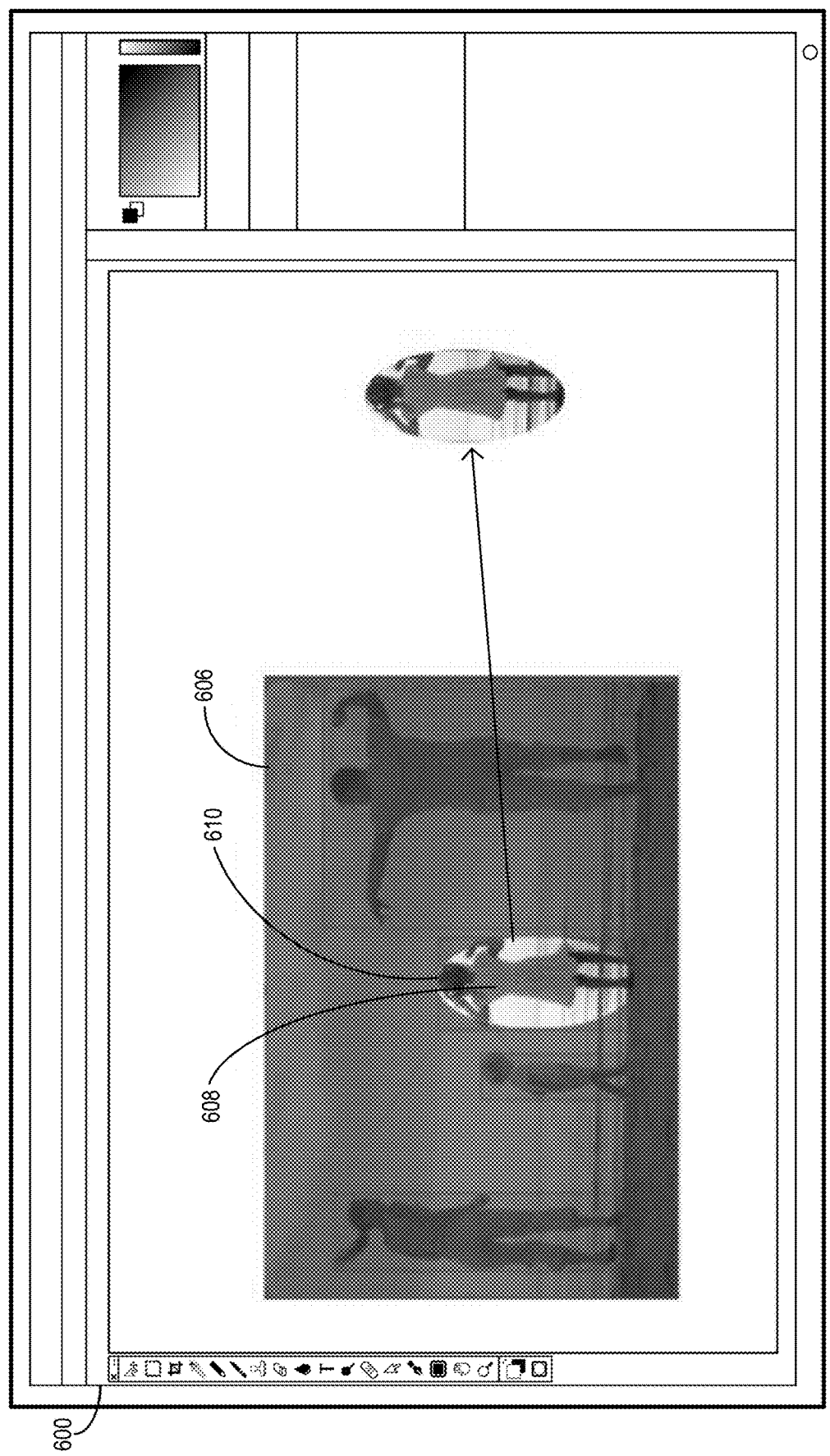

As mentioned above, in one or more embodiments, the design guide system 112 utilizes visual image editing guides to perform and/or refine a variety of digital image editing processes. For example, FIGS. 6A-6B illustrate the design guide system 112 clipping digital objects in digital images based on visual image editing guides. More specifically, in one or more embodiments, the design guide system 112 determines a bounding shape corresponding to a digital object in a digital image based on a filtered set of edge paths. Further, in one or more embodiments, in response to receiving user interaction, the design guide system 112 snaps the user interaction to a clipping boundary and clips the digital object (e.g., for moving or copying).

For example, FIG. 6A illustrates a graphical user interface 600 displayed on a client device 601. More specifically, FIG. 6A illustrates the graphical user interface 600 including a digital image 602 that itself includes a digital object portraying an elephant calf. As shown in FIG. 6A, the design guide system 112 determines a visual image editing guide 604 including a bounding shape for the digital object from a filtered set of edge paths. In addition, the design guide system 112 clips the digital object along the visual image editing guide 604 in response to receiving user interaction with the digital object.

More specifically, the design guide system 112 determines a visual image editing guide 604 including the bounding shape corresponding to the digital object elephant calf based on a filtered set of edge paths associated with the digital object. For example, the design guide system 112 determines an enclosing closed edge path corresponding to the digital object. Further, the design guide system 112 generates the visual image editing guide 604 (e.g., an oval shape or some other shape) encompassing the digital object. Thus, in response to receiving a user interaction selecting the digital object for transformation, the design guide system 112 clips the digital object 604 utilizing the visual image editing guide 604.

In one or more embodiments, the design guide system 112 automatically clips the digital object along the visual image editing guide 604 in response to receiving a user interaction with the digital object. To illustrate, in some embodiments, the design guide system 112 receives a user interaction selecting the digital object for clipping, and the design guide system 112 automatically clips (or suggests) the modification shown in FIG. 6A via the visual image editing guide 604. Thus, the design guide system 112 accurately modifies digital images based on the digital objects and edges within the digital images.

Additionally, FIG. 6B illustrates the graphical user interface 600 including a clipping of a digital object 608 corresponding to a young girl from a digital image 606. Similar to the discussion above with FIG. 6B, the design guide system 112 generates a visual image editing guide 610 based on an enclosing closed edge path corresponding to the digital object 608. Moreover, the design guide system 112 can perform a clipping operation by moving (or cutting and pasting) the digital object 608 within the visual image editing guide 610. Although FIG. 6A and FIG. 6B illustrate oval shaped guides, it will be appreciated that the design guide system 112 can utilize a variety of shapes. For example, in some embodiments, the design guide system 112 utilizes bounding boxes (as shown in the background of the digital image 606 for the various digital raster objects portrayed in the digital image 606).

Figure 7:
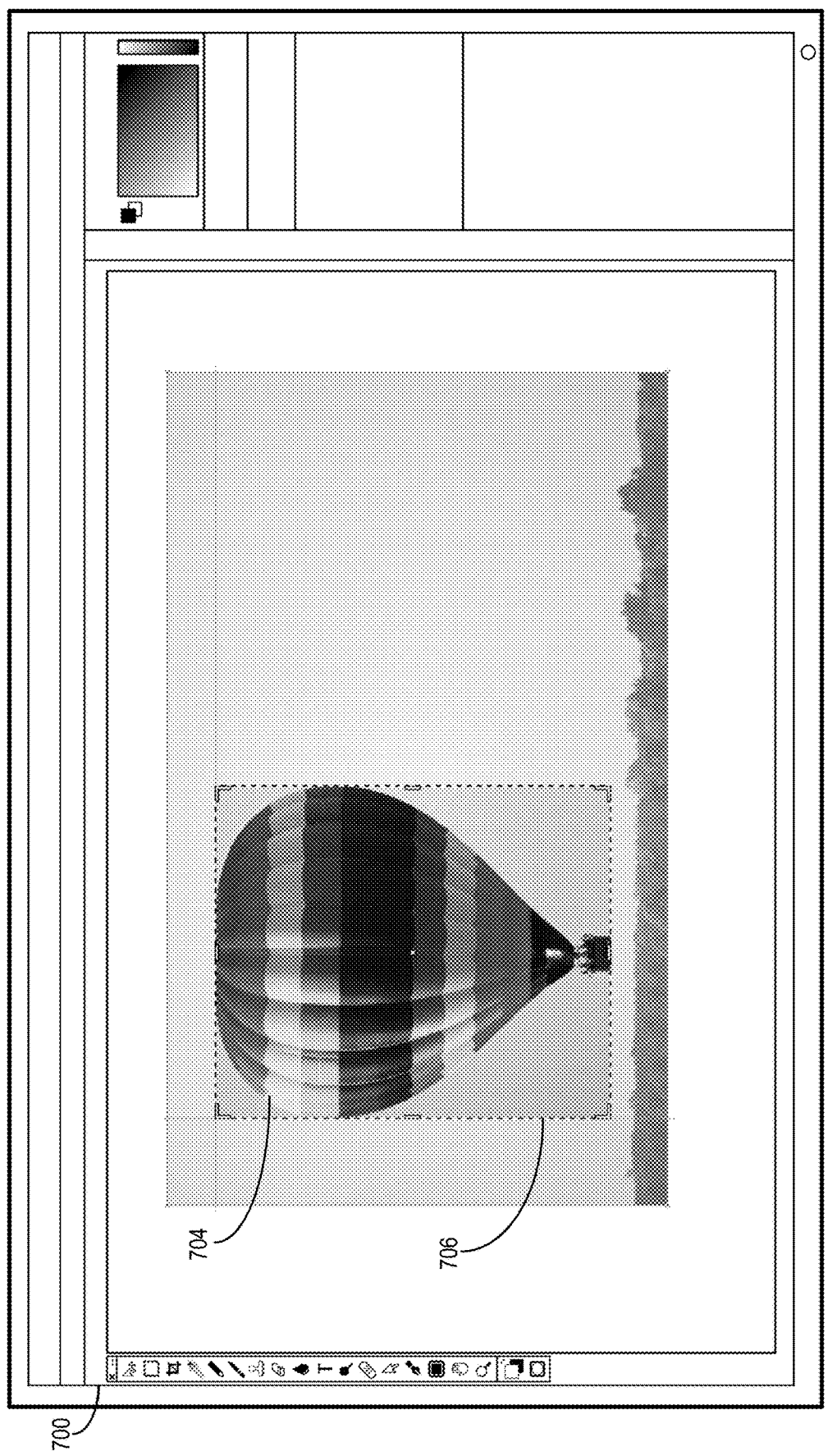
FIG. 7 illustrates a diagram of cropping utilizing visual image editing guides in accordance with one or more embodiments.

Additionally, the design guide system 112 can utilize visual image editing guides to generate cropping visual image editing guides (e.g., cropping suggestions). For example, FIG. 7 illustrates visual image editing guides utilized for a cropping suggestion in accordance with one or more embodiments. More specifically, FIG. 7 illustrates a graphical user interface 700 including a cropping visual image editing guide 706 for a digital object 704.

Further, the design guide system 112 generates a bounding box corresponding to the digital object 704 to generate the cropping suggestion. As discussed above with regard to FIGS. 6A-6B, in one or more embodiments, the design guide system 112 determines visual image editing guides corresponding to an enclosing closed edge path of a digital object.

In addition to the close, rounded bounding shape shown in FIGS. 6A-6B, in one or more embodiments the design guide system 112 generates a bounding box based on an enclosing closed edge path of a digital object.

As shown in FIG. 7, the design guide system 112 generates a bounding box corresponding to the digital object 704. The design guide system 112 provides the bounding box as the smallest rectangle including the entirety of the enclosing closed edge path corresponding to the digital object 704. In one or more embodiments, the design guide system 112 utilizes the bounding box as the cropping visual image editing guide 706 to suggest a crop of a digital image particular to a digital object in the digital image.

As discussed above, the design guide system 112 can suggest the crop in a variety of ways. For example, in response to selection of a cropping tool, the design guide system 112 can automatically display the cropping visual image editing guide 706. In some embodiments, the design guide system 112 can snap a cursor to the cropping visual image editing guide 706 (e.g., when a cursor comes within a snapping tolerance of the bounding box).

Figure 8:
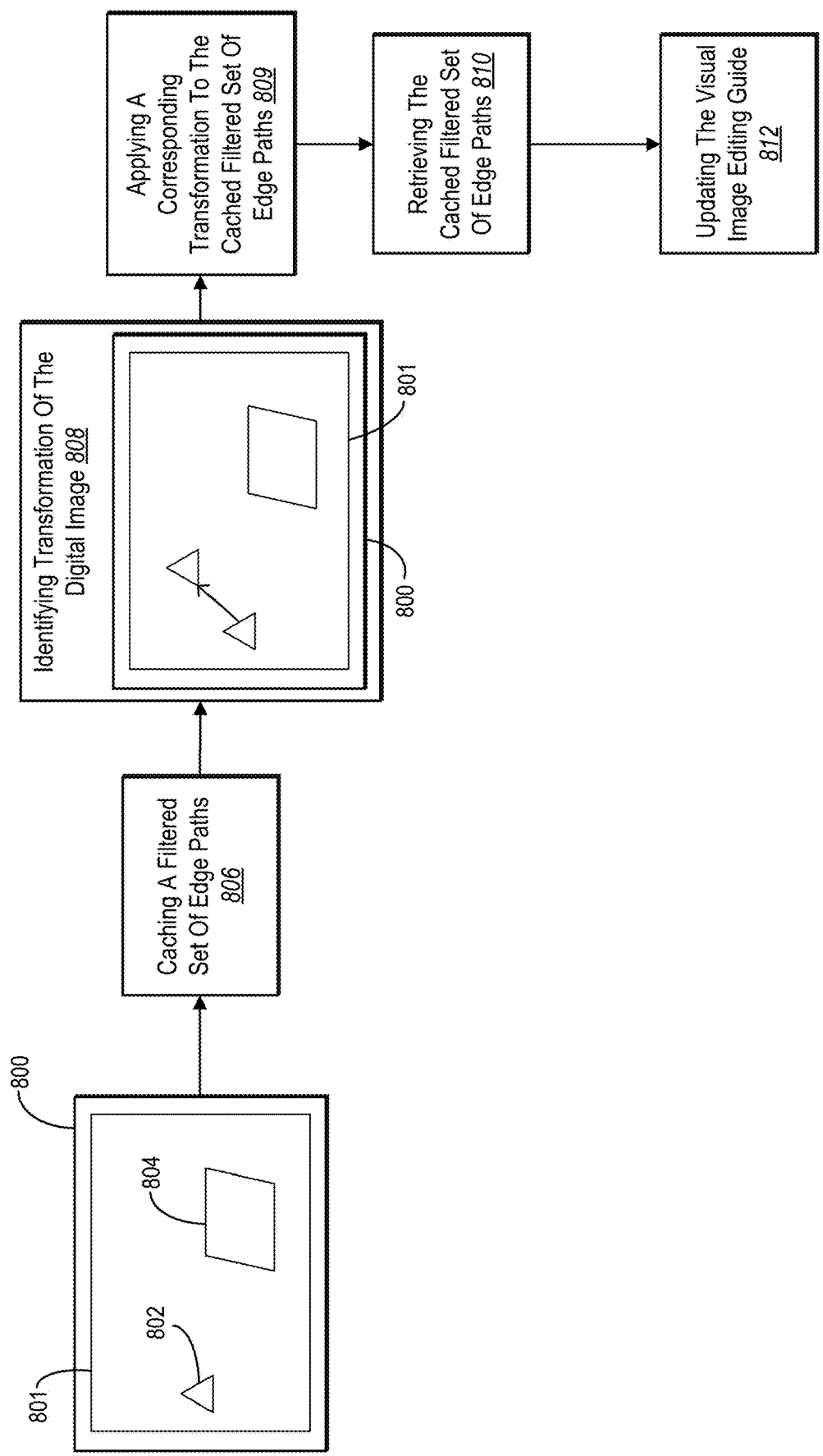
FIG. 8 illustrates a diagram of generating and/or updating visual image editing guides utilizing cached data in accordance with one or more embodiments.

As mentioned above, the design guide system 112 caches sets of edge paths to improve efficiency of utilizing and transforming corresponding visual image editing guides. FIG. 8 provides additional detail regarding caching, retrieving, and updating a filtered set of edge paths in accordance with one or more embodiments. More specifically, FIG. 8 illustrates a client device 800 including a digital image 801 including the digital objects 802, 804.

As shown in FIG. 8, in one or more embodiments, the design guide system 112 performs an act 806 of caching a filtered set of edge paths. More specifically, in one or more embodiments, the design guide system 112 builds the cache for the filtered set of edge paths by processing the digital image 801, determining a filtered set of edge paths (as described above), and then saving the filtered set of edge paths in local storage. Further, in one or more embodiments, the design guide system 112 caches the filtered set of edge paths as a reference corresponding to the cached digital image 801.

As further shown in FIG. 8, in some embodiments, the design guide system 112 performs an act 808 of identifying a transformation of the digital image. More specifically, as shown in FIG. 8, the design guide system 112 receives a translation of the digital object 802. In one or more embodiments, the design guide system 112 receives a variety of transformations, including translations, rotations, re-sizing, shearing, scaling (e.g., uniform or non-uniform scaling), etc.

Further, as shown in FIG. 8, in one or more embodiments, the design guide system 112 performs an act 809 of applying a corresponding transformation to the cached filtered set of edge paths. In some embodiments, the design guide system 112 updates the cached filtered set of edge paths based on the detected transformation. For example, as shown in FIG. 8, the design guide system 112 caches the transformed edge paths corresponding to the digital object 802.

In one or more embodiments, the design guide system 112 utilizes the following computer-implemented algorithm in caching edge paths for a digital image:

Algorithm: BuildCache( . . . )
Input: ImageRef, InnerBoundsData
1. Retrieve and cache the reference to the raster Image: ImageRef
2. Set the snapping module as an observer of the raster image such that any transformation applied to the image of any form is communicated to the snapping module.

3. Add an entry in map ImageToBoundsMap: with key as ImageRef storing its corresponding Important Visible bounds info: InnerBoundsData from Phase 2.

In some embodiments, the design guide system 112 sets a snapping module as an observer of the digital image 800. Accordingly, the design guide system 112 notifies the snapping module in response to any transformation received at the digital image 800. Thus, in one or more embodiments, the design guide system determines a transformation matrix based on the transformation received at the digital object 802. For example, the design guide system 112 generates an affine transformation matrix (e.g. a scaling transformation matrix, a shearing transformation matrix, a rotation transformation matrix) and/or a crop transformation matrix. Thus, in some embodiments, the design guide system updates the cache in response to receiving a transformation of edge paths in the digital image 800 utilizing the transformation matrix. Accordingly, the design guide system 112 can apply the same transformation received at the digital object 802 to the cached edge paths corresponding to the digital object 802. In this manner, the design guide system 112 can maintain an accurate, up-to-date filtered set of edge paths, without having to waste the computational expense of recreating the filtered set of edge paths (e.g., generating a simplified, binary image and filtering edges) in response to transformations of the digital image.

Additionally, as shown in FIG. 8, in some embodiments, the design guide system 112 performs an act 810 of retrieving the cached filtered set of edge paths. In one or more embodiments, based on updating the cached filtered set of edge paths, the design guide system 112 checks the updated cached filtered set of edge paths for updated edge paths. For example, in FIG. 8, the design guide system 112 identifies the edge paths corresponding to the digital object 802. Upon identifying an updated edge path, the design guide system 112 determines that visual image editing guides corresponding to the updated edge path should also be updated.

Accordingly, as also shown in FIG. 8, in one or more embodiments, the design guide system 112 performs an act 812 of updating the visual image editing guide. The design guide system 112 utilizes the updated cached edge paths to determine updated visual image editing guides. To illustrate, in one or more embodiments, the design guide system 112 generates the updated visual image editing guides along and/or extending from the updated cached edge paths. Thus, in some embodiments, the design guide system 112 generates the visual image editing guides to reflect the updated cached edge paths in the modified digital image. Accordingly, in some embodiments, the design guide system 112 generates visual image editing guides corresponding to an updated digital object such that the visual image editing guides maintain correspondence to edge paths making up the digital object.

In one or more embodiments, the design guide system 112 utilizes the following computer-implemented algorithm in updating the edge paths for a digital image:
Algorithm:UpdateCache( . . . )
1. CachedInnerContentBounds=Retrieve the Bounds info corresponding to the
ImageRef for which change notification is received.
2. If (change==Delete operation)
   a. Remove ImageRef entry from the Map
3. Else if (change==a type of affine transformation)
   a. NewTransformationMatrix=New transformed matrix of the image
   b. NewInnerContentBounds=TransXMatrix(CachedInnerContentBounds)
4. Else if (change==Crop operation)
   a. NewImageBounds=New bounds of the image
   b. NewInnerContentBounds=Intersect(NewImageBounds,CachedInnerContentBounds)

Figure 9:
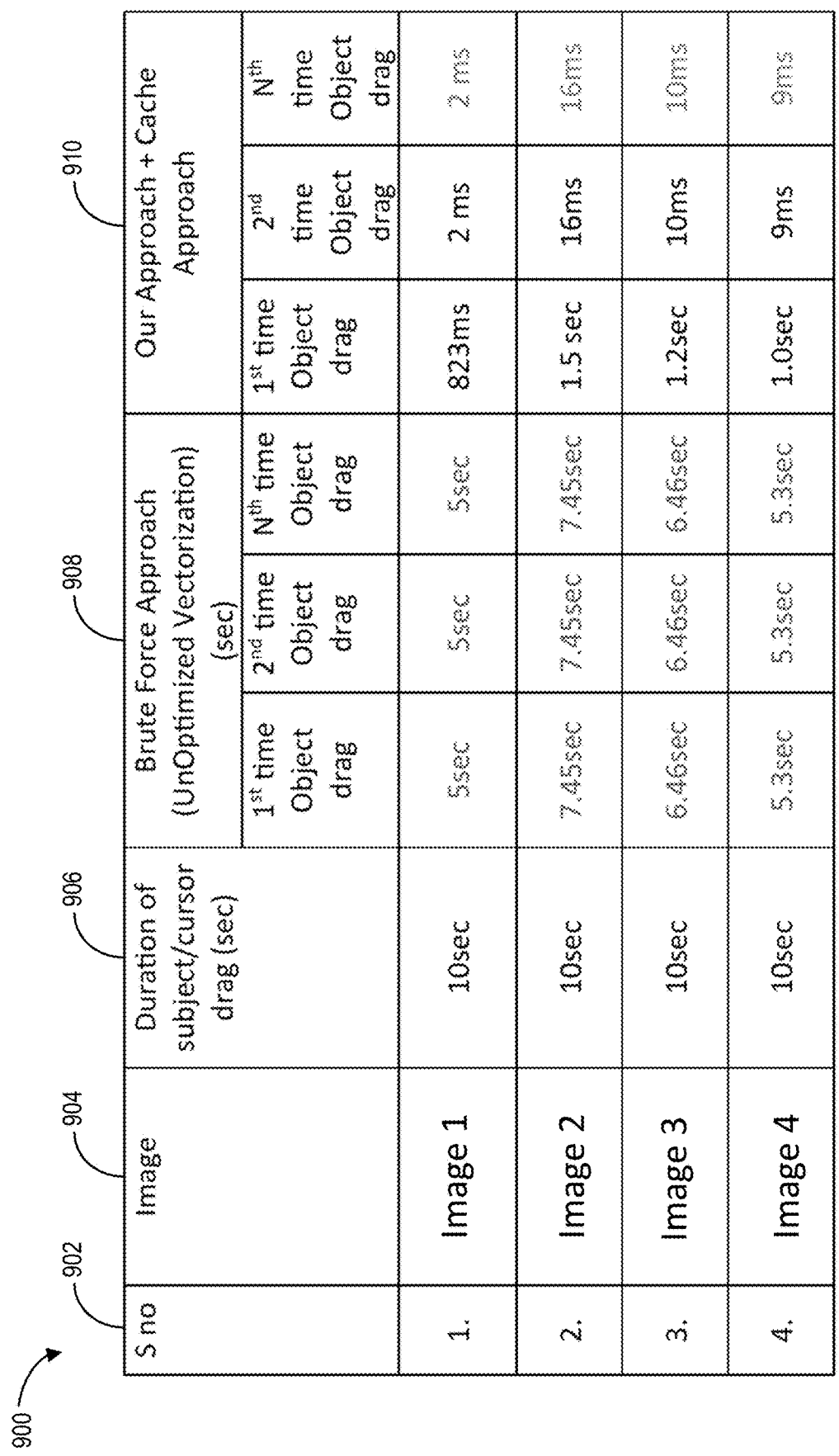
FIG. 9 illustrates a table illustrating efficiency improvements of the design guide system over conventional content management systems in accordance with one or more embodiments.

As suggested above, the design guide system 112 efficiently determines visual image editing guides for raster images by identifying and filtering edge paths and caching edge paths. As illustrated in FIG. 9, the design guide system 112 provides significant efficiency improvements in the time utilized by the design guide system 112 for providing visual image editing guides during motion of digital objects. More specifically, FIG. 9 illustrates a chart 900 illustrating processing time to move digital objects and provide digital visual guides utilizing a brute force approach as opposed to one or more embodiments of the design guide system 112 described above.

FIG. 9 illustrates time utilized in modification in four categories 902 of digital raster images 904. As shown in FIG. 9, the duration of interaction 906 is ten seconds for each interaction with each of the digital raster images 904. However, the brute force approach times 908 are significantly longer than the design guide system approach times 910. Additionally, the brute force approach times 908 remain constant while the design guide system approach times 910 decrease for interactions after a first interaction due to efficiency gains from caching.

For example, as shown in FIG. 9, the brute force approach times 908 for Image 1 are 5 seconds for each interaction. However, the design guide system approach times 910 for Image 1 are 823 ms for the first interaction, and 2 milliseconds for each interaction thereafter. Similarly, as shown in FIG. 9, the brute force approach times 908 for the "success" image are 7.45 seconds for each interaction. However, the design guide system approach times 910 for the "success" image are 1.4 milliseconds for the first interaction, and 16 milliseconds for each interaction thereafter.

Additionally, as shown in FIG. 9, the brute force approach times 908 for Image 2 are 6.46 seconds for each interaction. However, the design guide system approach times 910 for Image 2 are 1.2 seconds for the first interaction, and 10 milliseconds for each interaction thereafter. Also, as shown in FIG. 9, the brute force approach times 908 for Image 3 are 5.3 seconds for each interaction. However, the design guide system approach times 910 for Image 4 are 1 second for the first interaction, and 9 milliseconds for each interaction thereafter.

Figure 10:
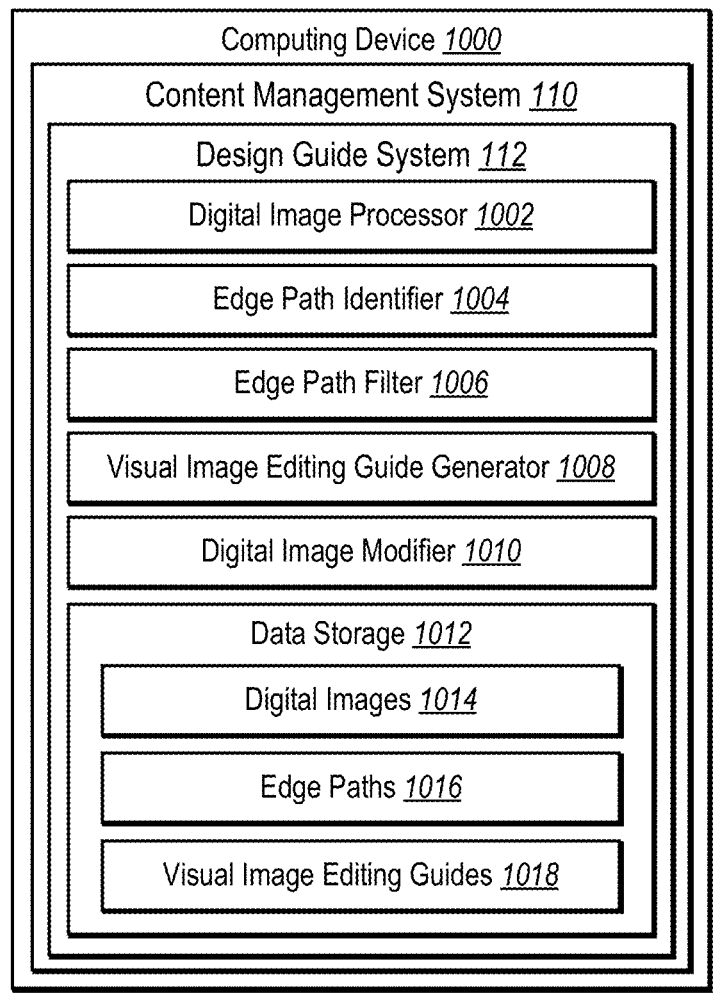
FIG. 10 illustrates a schematic diagram of a design guide system in accordance with one or more embodiments.

Turning now to FIG. 10, this figure provides additional detail regarding components and features of the design guide system 112. In particular, FIG. 10 illustrates a computing device 1000 implementing the content management system 110 and the design guide system 112. The computing device 1000 can include one or more servers (e.g., the server device(s) 108) and/or one or more client devices (e.g., the client device 102). As shown in FIG. 10, the computing device 1000 includes a digital image processor 1002, an edge path identifier 1004, an edge path filter 1006, a visual image editing guide generator 1008, a digital image modifier 1010, and a data storage 1012.

As shown in FIG. 10, the computing device 1000 includes the digital image processor 1002. In one or more embodiments, the digital image processor 1002 generates a simplified, binary digital image. More specifically, in some embodiments, the digital image processor 1002 utilizes a denoising algorithm and an adaptive thresholding algorithm to generate a simplified, binary digital image corresponding to a digital raster image.

Additionally, as shown in FIG. 10, the computing device 1000 includes the edge path identifier 1004. The edge path identifier 1004 can identify a set of edge paths from a simplified, binary digital image. More specifically, in one or more embodiments, the edge path identifier 1004 utilizes a contour detection algorithm to identify a set of edge paths from a simplified, binary digital image.

Further, as shown in FIG. 10, the computing device 1000 includes the edge path filter 1006. The edge path filter 1006 can filter a set of edge paths utilizing a threshold edge length. To illustrate, in some embodiments, the edge path filter 1006 identifies and filters enclosing closed edge paths and enclosed edge paths. More specifically, in one or more embodiments, the edge path filter 1006 automatically adds the enclosing closed edge paths to a filtered set of edge paths and applies a threshold edge length to the enclosed edge paths to determine which enclosed edge paths to add to the filtered set of edge paths.

Also, as shown in FIG. 10, the computing device 1000 includes the visual image editing guide generator 1008. In one or more embodiments, the visual image editing guide generator 1008 generates visual image editing guides based on a filtered set of edge paths. More specifically, the visual image editing guide generator 1008 can generate snapping guides and bounding shapes (e.g. bounding boxes). In some embodiments, the visual image editing guide generator 1008 generates the visual image editing guides along one or more edges from the filtered set of edge paths.

Additionally, as shown in FIG. 10, the computing device 1000 includes the digital image modifier 1010. The digital image modifier 1010 modifies digital images based on received user input. Further, in one or more embodiments, the digital image modifier 1010 modifies digital images based on visual image editing guides. For example, the digital image modifier 1010 can crop an image based on visual image editing guides, snap digital objects to visual image editing guides, and/or clip digital objects based on visual image editing guides.

Further, as shown in FIG. 10, the computing device 1000 includes the data storage 1012. The data storage 1012 accesses and stores files, indicators, and other data for the design guide system 112. For example, as shown in FIG. 10, the data storage 1012 includes digital images 1014, edge paths 1016, and visual image editing guides 1018.

Each of the components 1002-1012 of the design guide system 112 can include software, hardware, or both. For example, the components 1002-1012 can include one or more instructions stored on a computer-readable storage medium and executable by processors of one or more computing devices, such as a client device or server device. When executed by the one or more processors, the computer-executable instructions of the design guide system 112 can cause the computing device(s) to perform the methods described herein. Alternatively, the components 1002-1012 can include hardware, such as a special-purpose processing device to perform a certain function or group of functions. Alternatively, the components 1002-1012 of the design guide system 112 can include a combination of computer-executable instructions and hardware.

Furthermore, the components 1002-1012 of the design guide system 112 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1002-1012 may be implemented as a stand-alone application, such as a desktop or mobile application. Furthermore, the components 1002-1012 may be implemented as one or more web-based applications hosted on a remote server. The components 1002-1012 may also be implemented in a suite of mobile device applications or "apps." To illustrate, the components 1002-1012 may be implemented in an application, including but not limited to ADOBE® PHOTOSHOP, ADOBE® LIGHTROOM, and ADOBE® ILLUSTRATOR. "ADOBE", "ADOBE PHOTOSHOP", "ADOBE LIGHTROOM", and "ADOBE ILLUSTRATOR" are either registered trademarks or trademarks of Adobe Inc. in the United States and/or other countries.

Figure 11:
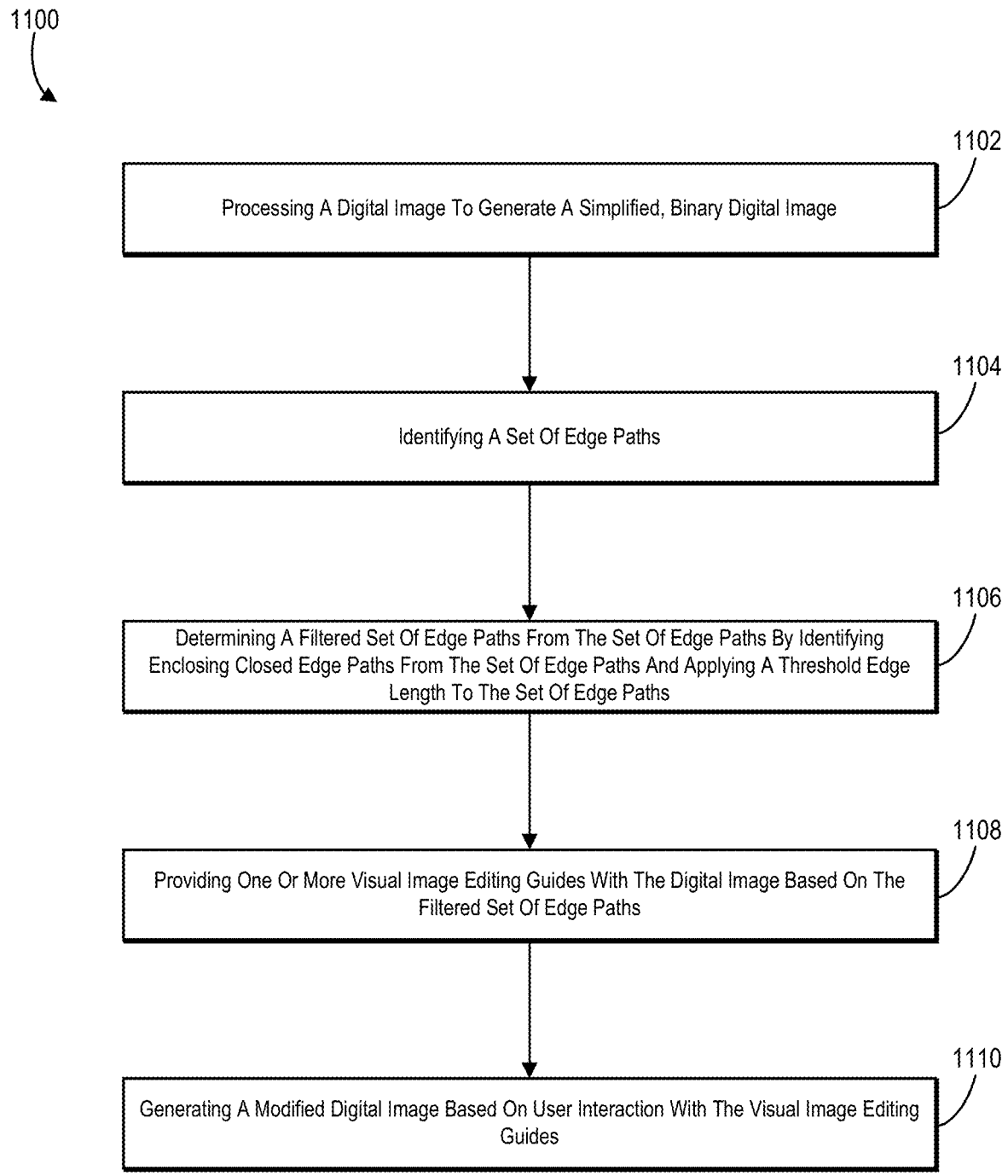
FIG. 11 illustrates a flowchart of a series of acts for generating visual image editing guides for digital raster images in accordance with one or more embodiments.

FIGS. 1-10, the corresponding text, and the examples provide a number of different methods, systems, devices, and non-transitory computer-readable media of the design guide system 112. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned, FIG. 11 illustrates a flowchart of a series of acts 1100 for generating visual image editing guides for digital raster images in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1102 for processing a digital image to generate a simplified, binary digital image. Specifically, the act 1102 can include utilizing a denoising algorithm to remove content from the digital image and generate a simplified digital image, and generating the simplified, binary digital image from the simplified digital image utilizing an adaptive thresholding algorithm.

To illustrate, the act 1102 can include processing a digital image utilizing a denoising algorithm and adaptive thresholding to generate a simplified, binary digital image. Additionally, the act 1102 can include generate a plurality of contours from the simplified, binary digital image utilizing a contour detection algorithm, and process the plurality of contours utilizing a gap detection algorithm and a filling algorithm to generate the set of edge paths. Further, the act 1102 can include utilizing the denoising algorithm to remove content from the digital image and generate a simplified digital image, and generating the simplified, binary digital image from the simplified digital image utilizing an adaptive thresholding algorithm.

As shown in FIG. 11, the series of acts 1100 includes an act 1104 for identifying a set of edge paths. In particular, the act 1104 can include identifying a set of edge paths from the simplified, binary digital image. In particular, the act 1104 can include. Specifically, the act 1104 can include utilizing a contour detection algorithm to identify a set of edge paths from the simplified, binary digital image.

As shown in FIG. 11, the series of acts 1100 includes an act 1106 for determining a filtered set of edge paths from the set of edge paths by identifying enclosing closed edge paths from the set of edge paths and applying a threshold edge length to the set of edge paths. In particular, the act 1106 can include determining a filtered set of edge paths from the set of edge paths by identifying enclosing closed edge paths from the set of edge paths and applying a threshold edge length to the set of edge paths. In particular, the act 1106 can include determine a filtered set of edge paths from the set of edge paths by identifying one or more encompassing closed edge paths from the set of edge paths, determining, from the set of edge paths, enclosed edge paths that fall within the one or more encompassing closed edge paths, and applying a threshold edge length to the enclosed edge paths to determine a filtered subset of enclosed edge paths.

Specifically, the act 1106 can include adding the enclosing closed edge paths to the filtered set of edge paths. Additionally, in one or more embodiments, the act 1106 includes identifying enclosed edge paths within the one or more enclosing closed edge paths, applying the threshold edge length to the enclosed edge paths, and adding a subset of the enclosed edge paths that satisfy the threshold edge length to the filtered set of edge paths. Further, the act 1106 can include identifying, from the set of edge paths, a set of linear edge paths that fall within a linear region of the digital image, applying the threshold edge length to a combined length of the set of linear edge paths, and in response to determining that the combined length of the set of linear edge paths satisfies the threshold edge length, adding the set of linear edge paths to the filtered set of edge paths.

As shown in FIG. 11, the series of acts 1100 includes an act 1108 for providing one or more visual image editing guides with the digital image based on the filtered set of edge paths. In particular, the act 1108 can include providing, for display via a client device, one or more visual image editing guides with the digital image based on the filtered set of edge paths. Specifically, the act 1108 can include generating a bounding shape for a closed edge path of the filtered set of edge paths and generating the one or more visual image editing guides based on the bounding shape. Additionally, the act 1108 can include generating a bounding box based on the one or more encompassing closed edge paths from the filtered set of edge paths and generating the one or more visual image editing guides based on the bounding box.

Further, the act 1108 can include identifying an open edge path from the filtered set of edge paths, determining a linear direction corresponding to the open edge path, and generating the one or more visual image editing guides by creating a linear guide based on the linear direction of the open edge path. Additionally, the act 1108 can include identifying a digital object in the digital image corresponding to an enclosing closed edge path of the enclosing closed edge path, and generating the one or more visual image editing guides by generating at least one of a clipping image editing guide or a cropping image editing guide for the digital object from the enclosing closed edge path.

As shown in FIG. 11, the series of acts 1100 includes an act 1110 for generating a modified digital image based on user interaction with the visual image editing guides. In particular, the act 1110 can include generating a modified digital image based on user interaction with the visual image editing guides. In particular, the act 1110 can include. Specifically, the act 1110 can include generating the modified digital image by snapping a digital object in the digital image to a visual image editing guide of the visual image editing guides. Further, the act 1110 can include caching the filtered set of edge paths corresponding to the digital image, based on identifying a transformation of the digital image, applying the transformation to the cached filtered set of edge paths to generate an updated filtered set of edge paths, and generating an additional visual image editing guide based on the updated filtered set of edge paths.

In addition, the act 1110 can include receiving an indication of user interaction with the digital object in the digital image, and generating the modified digital image based on the at least one of the clipping for the digital object or the cropping suggestion for the digital object. Additionally, the act 1110 can include wherein the visual image editing guides comprise at least one of a clipping image editing guide or a cropping image editing guide for a digital object portrayed in the digital image. Further, the act 1110 can include generating the modified digital image by snapping a digital object in the digital image to a visual image editing guide of the one or more visual image editing guides.

In addition to the foregoing, the series of acts 1100 can also include performing a step for generating one or more visual image editing guides from the set of edge paths. For instance, the algorithms and acts described in relation to FIGS. 4-7 can comprise the corresponding structures, acts, or algorithms for a step for generating one or more visual image editing guides from the set of edge paths.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

FIG. 12 illustrates a block diagram of example computing device 1200 (e.g., the server device(s) 108, the client device 102, or the computing device 1000) that may be configured to perform one or more of the processes described above. As shown by FIG. 12, the computing device 1200 can comprise a processor 1202, a memory 1204, a storage device 1206, an I/O interface 1208, and a communication interface 1210, which may be communicatively coupled by way of a communication infrastructure (e.g. a bus 1212). In certain embodiments, the computing device 1200 can include fewer or more components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions for digitizing real-world objects, the processor 1202 may retrieve (or fetch) the instructions from an internal register, an internal cache, the memory 1204, or the storage device 1206 and decode and execute them. The memory 1204 may be a volatile or non-volatile memory used for storing data, metadata, and programs for execution by the processor(s). The storage device 1206 includes storage, such as a hard disk, flash disk drive, or other digital storage device, for storing data or instructions related to object digitizing processes (e.g., digital scans, digital models).

The I/O interface 1208 allows a user to provide input to, receive output from, and otherwise transfer data to and receive data from computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI. The computing device 1200 can further include a bus 1212. The bus 1212 can include hardware, software, or both that connects components of computing device 1200 to each other.

Additionally, the communication interface 1210 may facilitate communications with various types of wired or wireless networks. The communication interface 1210 may also facilitate communications using various communication protocols. The communication infrastructure may also include hardware, software, or both that couples components of the computing device 1200 to each other. For example, the communication interface 1210 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
   process a digital image to generate a simplified, binary digital image;
   identify a set of edge paths from the simplified, binary digital image;
   determine a filtered set of edge paths from the set of edge paths by:
      identifying enclosing closed edge paths from the set of edge paths for inclusion in the filtered set of edge paths; and
      identifying threshold length edge paths from the set of edge paths for inclusion in the filtered set of edge paths by applying a threshold edge length;
   provide, for display via a client device, one or more visual image editing guides with the digital image based on the filtered set of edge paths; and
   generate a modified digital image based on user interaction with the one or more visual image editing guides.

2. The non-transitory computer-readable medium of claim 1, further comprising instructions that, when executed by the at least one processor, cause the computer system to generate the simplified, binary digital image by:
   utilizing a denoising algorithm to remove content from the digital image and generate a simplified digital image; and
   generating the simplified, binary digital image from the simplified digital image utilizing an adaptive thresholding algorithm.

3. The non-transitory computer-readable medium of claim 1, further comprising instructions that, when executed by the at least one processor, cause the computer system to:
   generate a plurality of contours from the simplified, binary digital image utilizing a contour detection algorithm; and
   process the plurality of contours utilizing a gap detection algorithm and a filling algorithm to generate the set of edge paths.

4. The non-transitory computer-readable medium of claim 1, further comprising instructions that, when executed by the at least one processor, cause the computer system to add enclosing closed edge paths to the filtered set of edge paths.

5. The non-transitory computer-readable medium of claim 4, further comprising instructions that, when executed by the at least one processor, cause the computer system to:
   identify enclosed edge paths within the enclosing closed edge paths;
   apply the threshold edge length to the enclosed edge paths; and
   add a subset of the enclosed edge paths that satisfy the threshold edge length to the filtered set of edge paths.

6. The non-transitory computer-readable medium of claim 1, further comprising instructions that, when executed by the at least one processor, cause the computer system to:
   identify, from the set of edge paths, a set of linear edge paths that fall within a linear region of the digital image;
   apply the threshold edge length to a combined length of the set of linear edge paths; and
   in response to determining that the combined length of the set of linear edge paths satisfies the threshold edge length, add the set of linear edge paths to the filtered set of edge paths.

7. The non-transitory computer-readable medium of claim 1, further comprising instructions that, when executed by the at least one processor, cause the computer system to:
   generate a bounding shape for a closed edge path of the filtered set of edge paths; and
   generate the one or more visual image editing guides based on the bounding shape.

8. The non-transitory computer-readable medium of claim 1, further comprising instructions that, when executed by the at least one processor, cause the computer system to:
   identify an open edge path from the filtered set of edge paths;
   determine a linear direction corresponding to the open edge path; and
   generate the one or more visual image editing guides by creating a linear guide based on the linear direction of the open edge path.

9. The non-transitory computer-readable medium of claim 1, further comprising instructions that, when executed by the at least one processor, cause the computer system to generate the modified digital image by snapping a digital object in the digital image to a visual image editing guide of the one or more visual image editing guides.

10. The non-transitory computer-readable medium of claim 9, further comprising instructions that, when executed by the at least one processor, cause the computer system to:
cache the filtered set of edge paths corresponding to the digital image;
based on identifying a transformation of the digital image, determining a transformation matrix;
utilizing the transformation matrix to apply the transformation to the cached filtered set of edge paths to generate an updated filtered set of edge paths; and
generate an additional visual image editing guide based on the updated filtered set of edge paths.

11. A system comprising:
one or more memory devices comprising a digital image; and
one or more computing devices that are configured to cause the system to:
process the digital image utilizing a denoising algorithm and adaptive thresholding to generate a simplified, binary digital image;
utilize a contour detection algorithm to identify a set of edge paths from the simplified, binary digital image;
determine a filtered set of edge paths from the set of edge paths by:
identifying one or more encompassing closed edge paths from the set of edge paths;
determining, from the set of edge paths, enclosed edge paths that fall within the one or more encompassing closed edge paths; and
identifying threshold length edge paths from the set of edge paths for inclusion in the filtered set of edge paths by applying a threshold edge length to the enclosed edge paths to determine a filtered subset of enclosed edge paths; and
process the one or more encompassing closed edge paths and the filtered subset of enclosed edge paths to provide, for display via a client device, one or more visual image editing guides with the digital image.

12. The system of claim 11, further comprising instructions that, when executed by the one or more computing devices, cause the system to generate a modified digital image based on user interaction with the one or more visual image editing guides.

13. The system of claim 12, further comprising instructions that, when executed by the one or more computing devices, cause the system to:
generate a bounding box based on the one or more encompassing closed edge paths from the filtered set of edge paths; and
generate the one or more visual image editing guides based on the bounding box.

14. The system of claim 12, further comprising instructions that, when executed by the one or more computing devices, cause the system to:
identify an open edge path from the filtered set of edge paths; and
generate the one or more visual image editing guides by generating a linear image editing guide based on the open edge path.

15. The system of claim 12, further comprising instructions that, when executed by the one or more computing devices, cause the system to:
identify a digital object in the digital image corresponding to an enclosing closed edge path of one or more enclosing closed edge paths; and
generate the one or more visual image editing guides by generating at least one of a clipping image editing guide or a cropping image editing guide for the digital object from the enclosing closed edge path.

16. The system of claim 15, further comprising instructions that, when executed by the one or more computing devices, cause the system to:
receive an indication of user interaction with the digital object in the digital image; and
generate the modified digital image based on the at least one of the clipping image editing guide or the cropping image editing guide for the digital object.

17. A method comprising:
processing a digital image utilizing a denoising algorithm and adaptive thresholding to generate a simplified, binary digital image;
identifying a set of edge paths from the simplified, binary digital image;
a step for generating one or more visual image editing guides from the set of edge paths; and
generating a modified digital image based on user interaction with the one or more visual image editing guides.

18. The method of claim 17, wherein the one or more visual image editing guides comprise at least one of a clipping image editing guide or a cropping image editing guide for a digital object portrayed in the digital image.

19. The method of claim 17, further comprising processing the digital image by:
utilizing the denoising algorithm to remove content from the digital image and generate a simplified digital image; and
generating the simplified, binary digital image from the simplified digital image utilizing an adaptive thresholding algorithm.

20. The method of claim 17, further comprising generating the modified digital image by snapping a digital object in the digital image to a visual image editing guide of the one or more visual image editing guides.

* * * * *